(12) United States Patent
Kaneko et al.

(10) Patent No.: US 9,358,581 B2
(45) Date of Patent: *Jun. 7, 2016

(54) HOT-DIP GALVANIZED STEEL SHEET AND METHOD FOR PRODUCING THE SAME

(75) Inventors: Rie Kaneko, Kawasaki (JP); Nobue Fujibayashi, Chiba (JP); Takahiro Kubota, Chiyoda-ku (JP)

(73) Assignee: JFE Steel Corporation, Tokyo (JP)

( * ) Notice: Subject to any disclaimer, the term of this patent is extended or adjusted under 35 U.S.C. 154(b) by 456 days.

This patent is subject to a terminal disclaimer.

(21) Appl. No.: 13/825,210

(22) PCT Filed: Sep. 28, 2011

(86) PCT No.: PCT/JP2011/072903
§ 371 (c)(1),
(2), (4) Date: Jul. 8, 2013

(87) PCT Pub. No.: WO2012/043864
PCT Pub. Date: Apr. 5, 2012

(65) Prior Publication Data
US 2013/0273389 A1    Oct. 17, 2013

(30) Foreign Application Priority Data
Sep. 29, 2010    (JP) .................................. 2010-219975

(51) Int. Cl.
*C23C 2/26* (2006.01)
*B05D 7/14* (2006.01)
(Continued)

(52) U.S. Cl.
CPC . *B05D 7/14* (2013.01); *B32B 15/08* (2013.01); *C08G 18/0814* (2013.01); *C09D 5/084* (2013.01); *C09D 5/24* (2013.01); *C09D 175/04* (2013.01); *C23C 22/40* (2013.01); *C23C 22/44* (2013.01); *C08K 3/0041* (2013.01);
(Continued)

(58) Field of Classification Search
CPC .................................... C23C 4/18; B05D 7/14
See application file for complete search history.

(56) References Cited

U.S. PATENT DOCUMENTS 8,648,135 B2 *   2/2014   Fujibayashi et al. ..........  524/413
2003/0213533 A1 *  11/2003  Sako et al. ....................  148/243
2009/0274926 A1 *  11/2009  Okai et al. ....................  428/626

FOREIGN PATENT DOCUMENTS

EP        1634932         3/2006
JP        53-121034 A     10/1978
(Continued)

OTHER PUBLICATIONS

Machine Translation of JP 2003013252 A, translated Aug. 13, 2015.*
(Continued)

*Primary Examiner* — David Turocy
(74) *Attorney, Agent, or Firm* — RatnerPrestia

(57) ABSTRACT

A method of producing a hot-dip galvanized steel sheet includes applying, to a hot-dip galvanized steel sheet having a Ra of 0.5 to 2.0 μm and a PPI of 150 or more, a predetermined surface treatment agent, i.e., a surface treatment agent containing a specified resin compound, a specified urethane resin having cationy, a specified silane coupling agent having a functional group, a specified organic Ti chelate compound, and a tetravalent vanadyl compound at a specified ratio; and drying the surface treatment agent at a ultimate sheet temperature of 50° C. to 180° C. to form a surface treatment coating film with a coating weight of 0.2 to 1.0 g/m² on the surface of the steel sheet.

4 Claims, 1 Drawing Sheet

(51) Int. Cl.

| | | |
|---|---|---|
| *C09D 5/08* | (2006.01) | |
| *C09D 5/24* | (2006.01) | |
| *C08G 18/08* | (2006.01) | |
| *C09D 175/04* | (2006.01) | |
| *B32B 15/08* | (2006.01) | |
| *C23C 22/40* | (2006.01) | |
| *C23C 22/44* | (2006.01) | |
| *C08K 3/00* | (2006.01) | |

(52) U.S. Cl.
CPC .............. *C23C 2/26* (2013.01); *C23C 2222/20* (2013.01); *Y10T 428/12569* (2015.01)

(56) References Cited

FOREIGN PATENT DOCUMENTS

| | | |
|---|---|---|
| JP | 54056037 A | 5/1979 |
| JP | 1-177380 A | 7/1989 |
| JP | 9-169078 A | 6/1997 |
| JP | 11-058599 A | 3/1999 |
| JP | 11310757 A | 11/1999 |
| JP | 2000-248369 A | 9/2000 |
| JP | 2001-059184 A | 3/2001 |
| JP | 2001-181860 A | 7/2001 |
| JP | 2001-247951 A | 9/2001 |
| JP | 2001247951 A * | 9/2001 |
| JP | 2003-013252 A | 1/2003 |
| JP | 2003013252 A * | 1/2003 |
| JP | 2003-105562 | 4/2003 |
| JP | 2003-155451 A | 5/2003 |
| JP | 2004-027263 A | 1/2004 |
| JP | 2004002958 | 1/2004 |
| JP | 2004-156081 A | 6/2004 |
| JP | 2004-238716 A | 8/2004 |
| JP | 2005-238535 A | 9/2005 |
| JP | 2006-043913 A | 2/2006 |
| JP | 2006-61953 A | 3/2006 |
| JP | 2006-082365 A | 3/2006 |
| JP | 2006-152436 A | 6/2006 |
| JP | 2006-278653 A | 10/2006 |

OTHER PUBLICATIONS

International Search Report dated Jan. 10, 2012, application No. PCT/JP2011/072903.
Extended European Search Report mailed Feb. 1, 2016 for European Application No. 11829416.4-1302.

* cited by examiner

HOT-DIP GALVANIZED STEEL SHEET AND METHOD FOR PRODUCING THE SAME

CROSS-REFERENCE TO RELATED APPLICATIONS

This application is a U.S. National Phase Application of PCT International Application No. PCT/JP2011/072903, filed Sep. 28, 2011, which claims priority to Japanese Patent Application No. 2010-219975, filed Sep. 29, 2010, the contents of these applications being incorporated by reference herein in their entireties.

FIELD OF THE INVENTION

The present invention relates to a method for producing a hot-dip galvanized steel sheet, and particularly to a production method capable of providing a hot-dip galvanized steel sheet having a uniform surface appearance, excellent conductivity and corrosion resistance, and a chromate-free surface treatment coating film.

BACKGROUND OF THE INVENTION

Hot-dip galvanized steel sheets have been used as steel sheets for home electric appliances, steel sheets for building materials, and steel sheets for automobiles. However, electrogalvanized steel sheets are mainly used for applications such as casings of home electric appliances, in which a surface appearance is regarded as being important, but hot-dip galvanized steel sheets are little used because unlike electrogalvanized steel sheets, a uniform surface appearance cannot be obtained due to spangle patterns or dross adhesion. However, hot-dip galvanized steel sheets can be produced through an annealing step and a coating step in one line after cold rolling and thus can be produced at lower cost than electrogalvanized steel sheets produced through an annealing step and an electrogalvanization step in different lines after cold rolling. Therefore, if the above-mentioned problem can be resolved, hot-dip galvanized steel sheets are lower-cost materials than electrogalvanized steel sheets for applications such as castings for home electric appliances.

On the other hand, there have recently been developed techniques for improving a surface appearance by imparting predetermined roughness to a galvanized surface of a hot-dip galvanized steel sheet. For example, Patent Literature 1 discloses a technique for achieving a uniform surface appearance required for automobile applications, particular for decreasing "a feel of roughness", by controlling centerline mean roughness Ra and mean peak spacing Sm of the surface of a hot-dip galvanized coating film in predetermined ranges. In addition, Patent Literature 2 discloses a technique for improving sharpness after painting by adjusting roughness parameters, such as Wca (height of filtered centerline waviness) and PPI (number of peaks of projections within a predetermined range) of a coated surface, within predetermined ranges.

Patent Literatures 1 and 2 do not describe conductivity and corrosion resistance of hot-dip galvanized steel sheets. With respect to corrosion resistance, there has been a technique of securing white rust resistance by coating a galvanized surface with a chemical conversion coating film, and corrosion resistance has been achieved by chromate treatment with a treatment solution containing chromic acid, dichromic acid, or a salt thereof as a main component.

Chromate treatment uses hexavalent chromium which is a pollution control substance, but hexavalent chromium is treated in a closed system in a treatment process and completely reduced and recovered without being released to the natural world. In addition, chromium elusion from a chromate coating film can be substantially completely eliminated by the action of sealing with an organic coating film, thereby causing substantially no pollution of environments and human bodies with hexavalent chromium. However, from the viewpoint of recent global environmental problems, use of hexavalent chromium tends to voluntarily decline, and products tend not to contain hexavalent chromium as much as possible.

Therefore, in order to prevent the occurrence of white rust on galvanized steel sheets, many treatment techniques without chromate treatment, i.e., chromate-free techniques, have been proposed. An example of the techniques is to form a surface treatment coating film on a galvanized steel sheet using an inorganic compound, an organic compound, an organic polymer material, or a composition containing a combination thereof.

However, it is difficult for conventional chrome-free techniques to satisfy both the conductivity and corrosion resistance of a surface-treated hot-dip galvanized steel sheet having a surface treatment coating film further formed on a galvanized steel sheet. A typical chromate-free surface treatment agent imparts corrosion resistance by forming a dense reaction layer with zinc of the surface of a galvanized steel sheet. Therefore, when a surface treatment agent having high reactivity to a galvanized surface is used for chromate-free treatment of a hot-dip galvanized steel sheet which is provided with proper irregularities in consideration of surface appearance, a thick coating film is formed on the galvanized surface, and thus excellent corrosion resistance is exhibited, but satisfactory conductivity cannot be obtained. On the other hand, when a surface treatment agent having low reactivity to a coating is used, particularly, a thin coating film is formed on a projecting portion, and excellent conductivity is achieved, but satisfactory corrosion resistance cannot be obtained.

As described above, a hot-dip galvanized steel sheet satisfying all of such a uniform surface appearance that it can be applied to casings of home electric alliances, and excellent conductivity and corrosion resistance has not been produced. The present invention is aimed at resolving this problem.

In addition, with respect to conventional chrome-free surface treatment agents, problems described below, which have been unrecognized, are being newly recognized.

A first problem is to improve corrosion resistance at a processed portion of a surface-treated galvanized steel sheet. A surface-treated galvanized steel sheet is processed (cutting, bending, or part welding) to form a product. In bending a surface-treated galvanized steel sheet, a coating on the surface side of a bend portion is extended. In this case, the surface treatment coating film is extended with the bending and is thus damaged to expose the galvanized surface, thereby causing the problem of deterioration in corrosion resistance at the exposed portion. In particular, in the case of bending, damage to the film and coating continuously occurs, not locally occurs as in extrusion, and thus it is very difficult to achieve corrosion resistance at the processed portion.

A second problem is to secure solvent resistance of a surface treatment coating film. In the processing step, oil stain adhering to the coating film surface or a symbol written with a magic marker may be wiped off with a solvent. In this case, the phenomenon of peeling or whitish discoloration (whitening) of the surface treatment coating film with the solvent is often observed. Peeling of the surface treatment coating film makes it impossible to achieve corrosion resistance of the (surface-treated) galvanized steel sheet, while whitening of the surface treatment coating film degrades the appearance quality.

A third problem is to secure paintability of the surface treatment coating film. The surface-treated galvanized steel sheet processed as described above may be surface-washed with an alkaline cleaner (alkaline degreasing) and then painted. Therefore, upper coating paintability after alkaline degreasing may be required. However, under the present situation, known documents of investigation of this property are not found.

A fourth problem is to satisfy both the corrosion resistance of the surface treatment coating film and the storage stability of the surface treatment agent. Recent chromate-free techniques most frequently use a so-called application type in which the surface treatment coating film is formed by application to the galvanized steel sheet and then drying. In order to impart a barrier effect to the thus-formed surface treatment coating film, the surface treatment coating film is required to have predetermined water resistance. This is because the surface treatment coating film which is easily re-dissolved in water has difficulty in securing corrosion resistance (barrier effect). On the other hand, it is industrially important that the surface treatment agent prepared as one liquid containing raw materials at a predetermined ratio can be stably stored. The surface treatment agent is desired to be stably stored without deterioration over a long period of time even when stored at 35 to 40° C. on the assumption of summer temperature. The storage stability requires the surface treatment agent to be prevented from thickening, gelling, or precipitating, i.e., the surface treatment agent is required to have predetermined water solubility, and further the quality at the time of preparation is required to be maintained over a long period of time even after storage.

Some examples of a conventional chrome-free technique are given below. Patent Literature 3 discloses a method in which an aqueous solution containing water-dispersible silica, an alkyd resin, and a trialkoxysilane compound is applied to a metal surface and then dried to form a coating film. In addition, Patent Literatures 4 and 5 disclose a surface treatment method aimed at imparting corrosion resistance to a metallic material by using a water-soluble resin composed of a hydroxypyrone compound derivative, and a method for imparting corrosion resistance to a metallic material using an aqueous solution of a hydroxystyrene compound or a water-dispersible polymer. Further, Patent Literature 6 discloses a technique using a surface treatment agent containing an aqueous resin, colloidal silica, and ammonium vanadate at a specified ratio. However, any one of these techniques cannot reach the development of a coating film which can be replaced for a chromate coating film in order to impart corrosion resistance.

Patent Literature 7 discloses a technique for a surface treatment coating film containing an organic resin and a thiocarbonyl group-containing compound, but corrosion resistance after alkaline degreasing is unsatisfactory. Patent Literature 8 discloses a technique for treating a surface of a metal plate with a treatment solution containing an organic resin, a silane coupling agent, and a solid lubricant in an aqueous lithium silicate solution, but corrosion resistance at a portion processed by bending becomes unsatisfactory because an inorganic component easily forms a hard polymer. Also, since an alkali metal is contained, secondary adhesion of a coating is degraded. Patent Literature 9 discloses a technique of forming a resin coating using an aqueous resin solution containing a carboxyl group-containing polyurethane resin, an ethylene-unsaturated carboxylic acid copolymer water dispersion solution, silica particles, and a silane coupling agent at a specified ratio, but solvent resistance and corrosion resistance at a processed portion are unsatisfactory. Patent Literature 10 discloses a steel sheet having a coating film which contains a urethane resin, a lubricant, an inorganic colloid compound, and a silane coupling agent at a specified ratio, but the steel sheet is designed on the assumption of electrodeposition coating and thus has excellent electrodeposition coating properties while satisfactory corrosion resistance at a processed portion is not achieved.

Patent Literature 11 discloses a surface treatment solution prepared by mixing a silane coupling agent with a urethane resin and adjusting the resultant mixture to pH 2.5 to 4.5, but corrosion resistance after alkaline degreasing is degraded, and solvent resistance is also unsatisfactory. Patent Literature 12 discloses a technique of forming a coating film using a treatment solution which contains an aqueous disperse resin, silica particles, and an organic titanate at a specified ratio, but corrosion resistance at a processed portion is unsatisfactory. Patent Literatures 13 and 14 disclose a technique of forming a coating film by using a treatment solution which contains a specified aqueous epoxy resin dispersion, a urethane resin dispersion, a silane coupling agent, phosphoric acid and/or a phosphate compound, and a compound having 1 to 5 fluorine atoms in its molecule, but there is room for improvement in corrosion resistance after alkaline degreasing and paintability because of a slight shortage of alkali resistance.

Patent Literature 15 discloses a technique of forming a coating film using a treatment solution which contains a specified resin compound, a vanadium compound, and a metal compound containing a specified metal, but corrosion resistance after alkaline degreasing cannot be achieved because of insufficient alkali resistance, and the problem of easy yellowing during heating is not resolved. Patent Literature 16 discloses a technique of forming a coating film using a treatment agent which contains a specified resin compound, a cation urethane resin containing a cationic functional group, a silane coupling agent containing a reactive functional group, a Ti compound, and an acid compound at a specified ratio. This technique can form a coating film having excellent corrosion resistance and fingerprint resistance, but corrosion resistance after alkaline degreasing, corrosion resistance at a processed portion, and solvent resistance are not investigated, leaving room for improvement in these properties. Patent Literature 17 discloses a technique for a surface treatment agent containing at least one aqueous resin selected from cationic and nonionic urethane resins, a specified resin compound, a metal compound containing a specified metal, and water, but alkali resistance, corrosion resistance at a processed portion, and solvent resistance are not investigated and are not sufficiently improved. Patent Literature 18 discloses a technique using a surface treatment agent which contains, at a specified ratio, a cationic urethane, a cationic phenol condensate, and a compound containing titanium and a specified metal, but solvent resistance and paintability are not investigated and are not sufficiently improved.

Further, any of the surface treatment agents of the conventional techniques containing a silane coupling agent tends to have low storage stability. Therefore, even if the surface treatment agents have no problem with appearance after storage, desired characteristics cannot be obtained in many cases, and the above-mentioned problems are not investigated in the conventional techniques.

Patent Literature

PTL 1: Japanese Unexamined Patent Application Publication No. 2004-27263

PTL 2: Japanese Unexamined Patent Application Publication No. 2006-61953
PTL 3: Japanese Unexamined Patent Application Publication No. 53-121034
PTL 4: Japanese Examined Patent Application Publication No. 57-44751
PTL 5: Japanese Unexamined Patent Application Publication No. 1-177380
PTL 6: Japanese Unexamined Patent Application Publication No. 11-310757
PTL 7: Japanese Unexamined Patent Application Publication No. 2000-248369
PTL 8: Japanese Unexamined Patent Application Publication No. 11-58599
PTL 9: Japanese Unexamined Patent Application Publication No. 2006-43913
PTL 10: Japanese Patent Publication No. 3573307
PTL 11: Japanese Unexamined Patent Application Publication No. 2001-59184
PTL 12: Japanese Unexamined Patent Application Publication No. 2003-155451
PTL 13: Japanese Unexamined Patent Application Publication No. 2006-82365
PTL 14: Japanese Unexamined Patent Application Publication No. 2004-238716
PTL 15: Japanese Unexamined Patent Application Publication No. 2001-181860
PTL 16: Japanese Patent Publication No. 3883831
PTL 17: Japanese Patent Publication No. 4078044
PTL 18: Japanese Unexamined Patent Application Publication No. 2006-152436

SUMMARY OF THE INVENTION

The present invention has been achieved in consideration of the above-mentioned present situation, and the present invention provides a hot-dip galvanized steel sheet having a chromate-free surface treatment coating film which has a uniform surface appearance and excellent conductivity and corrosion resistance, and to provide a method for producing the steel sheet.

As a result of keen research for solving the problems, the inventors found the following. First, it was found that not only a surface appearance but also conductivity can be improved by imparting proper roughness to a hot-dip galvanized steel sheet. Further, it was found that both the conductivity and corrosion resistance can be satisfied by treating a surface of a galvanized steel sheet with a specified surface treatment agent, i.e., a surface treatment agent which contains, at a specified ratio, a specified resin compound, a specified urethane resin having cationy, a specified silane coupling agent having a functional group, a specified organic Ti chelate compound, and a tetravalent vanadyl compound. The actions on conductivity and corrosion resistance according to the above findings are described latter. The present invention has been achieved on the basis of these findings and has the following gist and configuration.

(1) A method for producing a hot-dip galvanized steel sheet, the method being characterized by including:
applying a surface treatment agent with a pH of 4 to 5 to a hot-dip galvanized steel sheet having a Ra of 0.5 to 2.0 m and a PPI of 150 or more; and
drying the surface treatment agent at a ultimate sheet temperature of 50° C. to 180° C. to form a surface treatment coating film having a coating weight of 0.2 to 1.0 g/m² on the surface of the steel sheet, the surface treatment agent containing:

(A) a resin compound having a bisphenol skeleton represented by general formula (I) described below (hereinafter referred to as "resin compound (A)");
(B) a cationic urethane resin emulsion having at least one cationic functional group selected from primary to tertiary amino groups and quaternary ammonium bases (hereinafter referred to as "cationic urethane (B)");
(C) at least one silane coupling agent having at least one reactive functional group selected from an active hydrogen-containing amino group, an epoxy group, a mercapto group, and a methacryloxy group;
(D) an organic titanium chelate compound;
(E) a tetravalent vanadyl compound; and
(F) water.

The solid content of the cationic urethane (B) is 0.10 to 0.30 in terms of ratio by mass [(b)/{(a)+(b)+(c)}] relative to the total solid content of the resin compound (A), the cationic urethane (B), and the silane coupling agent (C).

The solid content of the silane coupling agent (C) is 0.60 to 0.85 in terms of ratio by mass [(c)/{(a)+(b)+(c)}] relative to the total solid content of the resin compound (A), the cationic urethane (B), and the silane coupling agent (C), and the solid content of the silane coupling agent (C) is 50 to 70 in terms of ratio by mass [(c)/Ti] relative to the content of the organic titanium chelate compound (D) in terms of titanium.

The content of the tetravalent vanadyl compound (E) in terms of vanadium is 0.30 to 0.50 in terms of ratio by mass (V/Ti) relative to the content of the organic titanium chelate compound (D) in terms of titanium.

Here, Ra represents arithmetic mean roughness according to JIS B 0601-1994, and PPI represents the number of peaks per 25.4 mm (1 inch) according to SAEJ911 determined from a roughness curve according to JIS B 0601-1994.

In each of the equations, (a) represents the solid content of the resin compound (A); (b), the solid content of the cationic urethane (B); (c), the solid content of the silane coupling agent (C); Ti, the content of the organic titanium chelate compound (D) in terms of titanium; and V, the content of the tetravalent vanadyl compound (E) in terms of vanadium.

Note

[Chem. 1]

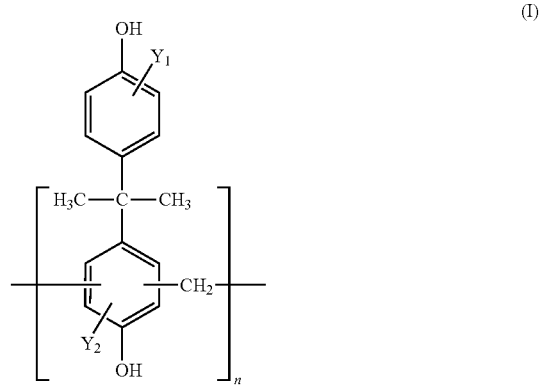

(I)

In the formula (I), $Y_1$ and $Y_2$ bonded to benzene rings are each independently a hydrogen atom or a Z group represented by general formula (II) or (III) below, and the average number of Z groups substituted per benzene ring is 0.2 to 1.0. In addition, n represents an integer of 2 to 50.

Note

[Chem. 2]

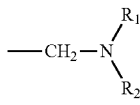
(II)

[Chem. 3]

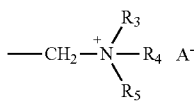
(III)

In the formulae (II) and (III), $R_1$, $R_2$, $R_3$, $R_4$, and $R_5$ each independently represent a hydrogen atom, an alkyl group having 1 to 10 carbon atoms, or a hydroxyalkyl group having 1 to 10 carbon atoms, and $A^-$ represents a hydroxide ion or an acid ion.

(2) The method for producing a hot-dip galvanized steel sheet described above in (1), wherein the surface treatment agent further contains wax (W), and the solid content of the wax (W) is 0.01 to 0.10 in terms of ratio by mass relative to the surface treatment coating film.

(3) A hot-dip galvanized steel sheet produced using the method for producing a hot-dip galvanized steel sheet described above in (1) or (2).

According to the present invention, not only a uniform surface appearance but also conductivity can be improved by adjusting Ra and PPI of a galvanized surface in predetermined ranges. Since the surface treatment agent having low reactivity to the galvanized surface is used, the thickness of the surface treatment coating film formed on a projecting portion is decreased, resulting in an increase in conductivity. In addition, since the surface treatment agent used in the present invention contains the silane coupling agent which can form a dense coating film, sufficient corrosion resistance can be achieved even when the coating film on a projecting portion is thin. Consequently, a hot-dip galvanized steel sheet satisfying all the surface appearance, conductivity, and corrosion resistance can be produced.

DETAILED DESCRIPTION OF EMBODIMENTS OF THE INVENTION

Details of embodiments of the present invention and the reasons for limitation are described below.
<Treatment Base Sheet>

In the present invention, a steel sheet (treatment base sheet) used as a base for a surface treated steel sheet is a hot-dip galvanized steel sheet for home electric appliances, building materials, and automobile parts. The steel type of the treatment base sheet is not particularly limited, and various steel sheets such as low-carbon steel, ultralow-carbon steel, IF steel, and a high-tensile steel sheet to which various alloy elements are added, can be used. In addition, any of a hot-rolled steel sheet and a cold-rolled steel sheet can be used, but a cold-rolled steel sheet is preferably used for application to home electric appliances.

In the specification, the term "hot-dip galvanized steel sheet" includes not only a hot-dip galvanized steel sheet (GI steel sheet) but also hot-dip galvannealed steel sheets (GF steel sheet and GL steel sheet) produced by hot-dip coating with a hot galvanization bath containing Al and Mg. Further, for the purpose of improving blackening resistance of a steel sheet, trace amounts of Ni and Co may be added to a coating or such metals may be precipitated on a surface of a steel sheet by using an acid or aqueous alkaline solution containing Ni, Co, and Fe. The present invention does not exhibit a significant advantage for an electro-galvanized steel sheet because uniform coating can be made, thereby causing not so big problem with the surface appearance. Therefore, the electro-galvanized steel sheet can be excluded. In addition, even when roughness is not positively imparted to a hot-dip galvannealed steel sheet (GA steel sheet), micro irregularities can be formed depending on the structure of a coating film, thereby securing an appearance and conductivity. Therefore, the galvannealed steel sheet can be excluded. According to the present invention, an excellent surface appearance at the same level as that of an electro-galvanized steel sheet can be achieved, thereby permitting preferred use for casings of home electric appliances.
<Surface Roughness of Hot-Dip Galvanized Steel Sheet>

After hot coating, temper rolling is performed to adjust a coated surface (before treatment with a surface treatment agent) to a Ra of 0.5 to 2.0 μm and a PPI of 150 or more, so that a uniform surface appearance and excellent conductivity can be achieved.

Ra is arithmetic mean roughness represented by an expression below and is determined according to JIS B0601:1994. In the expression, f(x) represents a roughness curve obtained by cutting off long-wavelength components from a profile curve with a filter having a cut-off value of 0.8 mm, the profile curve being measured using a three-dimensional surface roughness shape measuring apparatus (manufactured by Tokyo Seimitsu Co., Ltd., stylus end radius: 2 μm). In addition, L represents a reference length.

$$Ra = (1/L) \int_0^L f(x) dx$$ [Equation 1]

Figure 1:
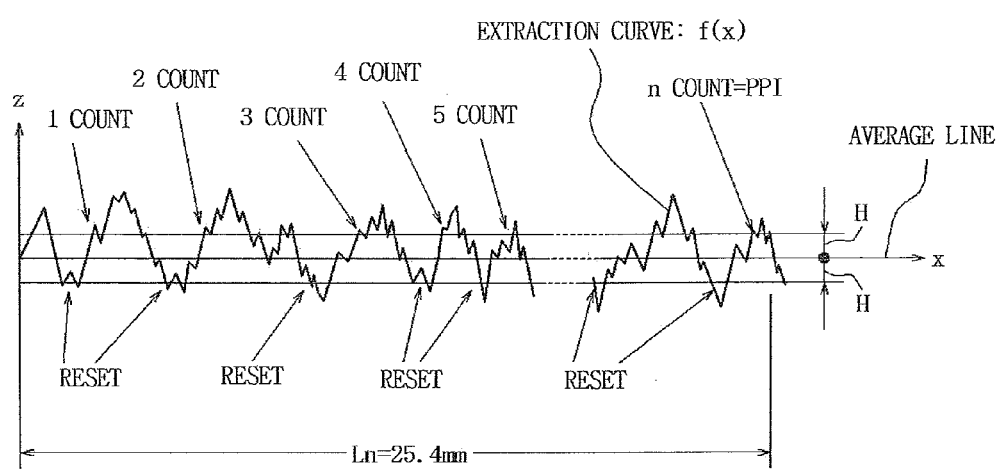
FIG. 1 is a schematic diagram for explaining a method for determining PPI.

PPI is determined according to SAEJ911 from a roughness curve obtained according to JIS B 0601-1994. FIG. 1 shows an example of a roughness curve obtained by cutting off long-wavelength components from a profile curve with a filter having a cut-off value of 0.8 mm, the profile curve being measured using a three-dimensional surface roughness shape measuring apparatus (manufactured by Tokyo Seimitsu Co., Ltd., stylus end radius: 2 μm). In FIG. 1, predetermined reference levels H are provided in both the positive and negative directions from an average line of the roughness curve, and when the curve exceeds the negative reference level, returns in the positive direction, and then further exceeds the positive reference level, the count is 1. The counting is repeated until reaching the evaluation length Ln, and a number indicated by the count is defined as PPI. Here, Ln is 1 inch (=25.4 mm), and 2H (peak count level: distance between the positive and negative reference levels)=50 μinch (=1.27 μm).

In the present invention, many relatively small projecting portions are formed on the surface of the steel sheet so that Ra is preferably 0.5 to 2.0 μm and PPI is preferably 150 or more. As a result, not only the uniform surface appearance but also excellent conductivity can be achieved. That is, the hot-dip galvanized steel sheet used in the present invention preferably has the above-described both parameters within the respective predetermined ranges, and if one of the parameters is out of the range, one or both the surface appearance and conductivity are degraded.

When Ra is less than 0.5 μm, after the surface treatment coating film is formed, the thickness of the coating film on a projecting portion is increased, and thus a thin film portion is not easily formed, thereby failing to achieve conductivity. In addition, a spangle pattern is made apparent, resulting in a nonuniform appearance. On the other hand, even when Ra exceeds 2.0 μl, the effect of thinning a film on a projecting portion is substantially constant, and thus an improvement in conductivity level is not observed. In addition, in processing of a work roll used in temper rolling described below, a PPI of 150 or more cannot be easily achieved. Ra is more preferably less than 1.8 μm because a PPI of 150 or more can be stably produced. When PPI is less than 150, there are few projecting portions with thin surface treatment coating films formed thereon, and thus conductivity undesirably cannot be stably achieved. The PPI is more preferably 300 or less. When the PPI is 300 or less, there is a proper number of projecting portions having thin coating films formed thereon, and corrosion resistance is not degraded. Therefore, the PPI is limited in the above-described numerical range.

One of the characteristics of the present invention is that the surface roughness of the hot-dip galvanized steel sheet is adjusted as described above before treatment with the surface treatment agent, and the roughness of the treatment base sheet is not particularly limited. Although described in detail below, Ra and PPI can be controlled by controlling the temper rolling conditions such as the surface shape of a work roll, an elongation percentage, rolling oil, etc. during temper rolling.

<Surface Treatment Agent>

Next, the surface treatment agent used in the present invention is described. The surface treatment agent is characterized by containing (A) a resin compound represented by general formula (I) below, (B) cationic urethane, (C) at least one silane coupling agent having at least one reactive functional group selected from an active hydrogen-containing amino group, an epoxy group, a mercapto group, and a methacryloxy group, (D) an organic titanium chelate compound, (E) a tetravalent vanadyl compound, and (F) water. The solid content of the cationic urethane (B) is 0.10 to 0.30 in terms of ratio by mass [(b)/{(a)+(b)+(c)}] relative to the total solid content of the resin compound (A), the cationic urethane (B), and the silane coupling agent (C). The solid content of the silane coupling agent (C) is 0.60 to 0.85 in terms of ratio by mass [(c)/{(a)+(b)+(c)}] relative to the total solid content of the resin compound (A), the cationic urethane (B), and the silane coupling agent (C), and the solid content of the silane coupling agent (C) is 50 to 70 in terms of ratio by mass [(c)/Ti] relative to the content of the organic titanium chelate compound (D) in terms of titanium. The content of the tetravalent vanadyl compound (E) in terms of vanadium is 0.30 to 0.50 in terms of ratio by mass (V/Ti) relative to the content of the organic titanium chelate compound (D) in terms of titanium. In addition, pH is 4 to 5. In each of the equations, (a) represents the solid content of the resin compound (A); (b), the solid content of the cationic urethane (B); (c), the solid content of the silane coupling agent (C); Ti, the content of the organic titanium chelate compound (D) in terms of titanium; and V, the content of the tetravalent vanadyl compound (E) in terms of vanadium.

In the specification, the term "solid content" represents the heating residue after drying at 110° C. for 2 hours.

The significant effect that conductivity can be further improved, and corrosion resistance is not impaired is exhibited by forming the surface treatment coating film on the hot-dip galvanized steel sheet having the above surface roughness with the surface treatment agent. Further, when the surface treatment agent is used, it is possible to form a coating having excellent corrosion resistance at a bend portion introduced in a production process, excellent solvent resistance, and excellent paintability (particularly, paintability after alkaline degreasing), thereby producing a chrome-free galvanized steel sheet rich in practicality as compared with usual products. Further, the surface treatment agent is excellent in storage stability and is thus industrially very advantageous because the same coating can be formed even after storage.

In the surface treatment agent used in the present invention, the resin compound (A) having a bisphenol skeleton is represented by the following general formula (I).

[Chem. 4]

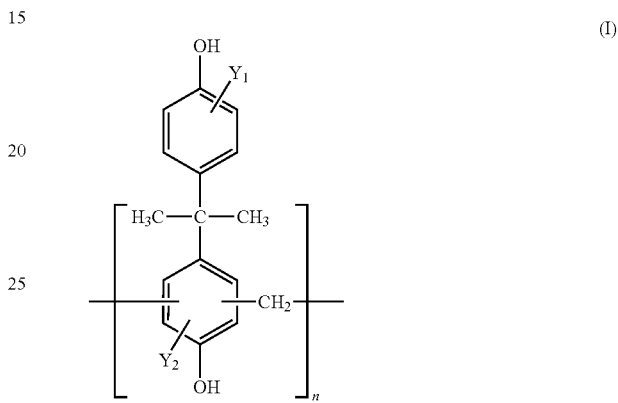

(I)

In the formula (I), $Y_1$ and $Y_2$ bonded to benzene rings are each independently a hydrogen atom or a Z group represented by general formula (II) or (III) below, and the average number of Z groups substituted per benzene ring is 0.2 to 1.0. In addition, n represents an integer of 2 to 50.

Here, the average number of Z groups substituted is a value obtained by dividing the total number of Z groups introduced by the total number of benzene rings (i.e., 2n). In the present invention, when a Z group is selected as each of $Y_1$ and $Y_2$, the resin compound (A) contains at least one cationic functional group of primary to tertiary amino groups and quaternary ammonium bases, and thus the resin compound can be stably dissolved in the acid (pH of 4 to 5) surface treatment agent intended in the present invention. In addition, in the present invention, the average degree of polymerization n is preferably 2 to 50. When n is less than 2, the effect of imparting corrosion resistance becomes unsatisfactory, while when n exceeds 50, stability in the treatment agent is decreased due to a decrease in water solubility and thickening, thereby causing unsatisfactory storage stability.

[Chem. 5]

(II)

[Chem. 6]

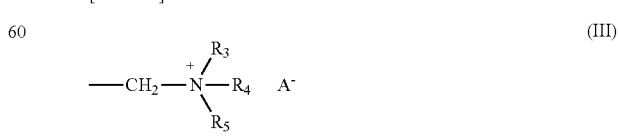

(III)

In the formulae (II) and (III), $R_1$, $R_2$, $R_3$, $R_4$, and $R_5$ each independently represent a hydrogen atom, an alkyl group having 1 to 10 carbon atoms, or a hydroxyalkyl group having 1 to 10 carbon atoms. When the number of carbons in an alkyl group or a hydroxyalkyl group exceeds 10, the resin compound (A) becomes inapplicable because it cannot be sufficiently solubilized in water and is destabilized in the treatment agent. Examples of $R_1$, $R_2$, $R_3$, $R_4$, and $R_5$ include methyl, ethyl, propyl, butyl, hydroxyethyl, 2-hydroxypropyl, hydroxyisobutyl, and the like.

$A^-$ represents a hydroxide ion or acid ion. Examples of the acid ion include acetate ions, phosphate ions, formate ions, and the like.

The resin compound (A) represented by the general formula (I) is a bisphenol-formalin condensate, and a synthesis method thereof is not limited. The resin compound (A) is can be produced by, for example, reacting bisphenol A with formalin and an amine in the presence of an alkali catalyst.

In the surface treatment agent used in the present invention, polyol and isocyanate components of the cationic urethane (B), which are constituent monomer components, and the polymerization method are not particularly limited as long as the urethane (B) has at least one cationic functional group selected from primary to tertiary amino groups and quaternary ammonium bases. Examples of the cationic functional group include an amino group, a methylamino group, an ethylamino group, a dimethylamino group, a diethylamino group, a trimethylamino group, a triethylamino group, and the like. The primary to tertiary amino groups or quaternary ammonium bases are not limited as long as the performance of the present invention is not impaired.

In the surface treatment agent used in the present invention, the silane coupling agent (C) is preferably trialkoxysilane having at least one reactive functional group selected from an active hydrogen-containing amino group, an epoxy group, a mercapto group, and a methacryloxy group and further having three alkoxy groups. Usable examples of at least one silane coupling agent include, but are not particularly limited to, N-(aminoethyl)-3-aminopropyltrimethoxysilane, 3-aminopropyltrimethoxysilane, 3-glycidoxypropyltrimethoxysilane, 3-glycidoxypropylmethyldimethoxysilane, 2-(3,4-epoxycyclohexyl)ethyltriethoxysilane, 3-mercaptopropyltrimethoxysilane, and the like.

In the surface treatment agent used in the present invention, examples of the organic titanium chelate compound (D) include titanium acetylacetonate, titanium octylene glycolate, titanium tetraacetylacetonate, titanium ethylacetoacetate, and the like. Inorganic salts such as titanium nitrate, titanium sulfate, titanium acetate, titanium phosphate, titanium carbonate, and the like are undesirable because they cannot be stably dissolved in the treatment agent of the present invention or do not exhibit the effect of improving corrosion resistance. Although the effect is obtained by titanium hydrofluoride, the titanium hydrofluoride is preferably mixed so that the fluorine content is 0.8% by mass or less in terms of ratio by mass relative to the total solid content of the resin compound (A), the cationic urethane (B), and the silane coupling agent (C). At a fluorine content of 0.8% by mass or less, the corrosion resistance at a processed portion is not degraded. When an aqueous solution of the organic titanium chelate compound is used, titanium is dissolved as a chelate complex, and thus it is preferred that a water-soluble solvent or peroxide having high polarity which influences the complex is not added to the treatment agent of the present invention.

In the surface treatment agent used in the present invention, examples of the tetravalent vanadyl compound (E) include, but are not particularly limited to, vanadyl sulfate, vanadyl dichloride, vanadyl phosphate, vanadyl oxalate, vanadyl acetylacetonate, and the like. A pentavalent vanadium compound has high water solubility and thus has high elusion from the coating film and has the small effect of improving corrosion resistance. As the tetravalent vanadyl compound used in the surface treatment agent of the present invention, a vanadyl compound which becomes $VO^{2+}$ (vanadyl) ion is most preferred because of the highest effect of improving corrosion resistance.

In the surface treatment agent used in the present invention, the solid content of the cationic urethane (B) is preferably 0.10 to 0.30 in terms of ratio by mass [(b)/{(a)+(b)+(c)}] relative to the total solid content of the resin compound (A), the cationic urethane (B), and the silane coupling agent (C). The ratio by mass is more preferably 0.12 to 0.28. When the ratio by mass is less than 0.10, the corrosion resistance at a bend portion, heat resistance, and the storage stability of the surface treatment agent are degraded due to the excessively low ratio of the urethane resin. When the ratio by mass exceeds 0.30, solvent resistance is degraded.

In the surface treatment agent used in the present invention, the solid content of the silane coupling agent (C) is preferably 0.60 to 0.85 in terms of ratio by mass [(c)/{(a)+(b)+(c)}] relative to the total solid content of the resin compound (A), the cationic urethane (B), and the silane coupling agent (C). The ratio by mass is more preferably 0.65 to 0.80. When the ratio by mass is less than 0.60, solvent resistance is degraded. When the ratio by mass exceeds 0.85, the corrosion resistance at a processed portion and the storage stability of the surface treatment agent are degraded.

In the surface treatment agent used in the present invention, the solid content of the silane coupling agent (C) is preferably 50 to 70 in terms of ratio by mass [(c)/Ti] relative to the content of the organic titanium chelate compound (D) in terms of titanium. The ratio by mass is more preferably 55 to 65. When the ratio by mass is less than 50, the corrosion resistance at a processed portion and the storage stability are degraded, while when the ratio by mass exceeds 70, elusion from the coating film is increased, and paintability after alkaline degreasing is decreased.

In calculating the above-described ratio by mass, the mass of the silane coupling agent (C) is the mass under a condition in which alkoxysilane (R—Si(—$OR_1$)$_3$) is hydrolyzed into silanol (R—Si(—OH)$_3$). This is because the silane coupling agent is mostly hydrolyzed when being dissolved in water, and an alcohol produced by hydrolysis is evaporated when the treatment agent of the present invention is applied and dried to form the coating film and thus does not function as an effective component.

In the surface treatment agent used in the present invention, the content of the tetravalent vanadyl compound (E) in terms of vanadium is preferably 0.30 to 0.50 in terms of ratio by mass (V/Ti) relative to the content of the organic titanium chelate compound (D) in terms of titanium. The ratio by mass is more preferably 0.35 to 0.48. When the ratio by mass is less than 0.30, corrosion resistance is degraded, while when the ratio by mass exceeds 0.50, paintability after alkaline degreasing is degraded.

The surface treatment agent used in the present invention is preferably adjusted to pH 4 to 5. With less than pH 4, zinc is much eluted from the galvanized steel sheet to be surface-treated, thereby decreasing corrosion resistance. On the other hand, with over pH 5, the stability of the surface treatment agent cannot be attained. As an acid component used for adjusting the pH to 4 to 5, phosphoric acid, acetic acid, formic acid, hydrofluoric acid, and fluoride are preferred, while strong acids such as sulfuric acid and nitric acid are undesired. This is because when sulfuric acid or nitric acid is used, cation phenol and cation urethane tend to be gelled in the surface treatment agent due to pH shock (local and rapid pH change) in pH adjustment, and a salt formed with gelling is highly eluted, thereby decreasing corrosion resistance. Acetic acid and formic acid are weak acids and are thus preferred for pH adjustment. These weak acids are also preferred from the viewpoint that the acids have high volatility and are thus evaporated during drying of the surface treatment agent, thereby decreasing the residue in the coating film and little decreasing the performance even in an excessively large adding amount. In use of phosphoric acid, the content is preferably 8% by mass or less, more preferably 6% by mass or less, relative to the total solid content of the resin compound (A), the cationic urethane (B), and the silane coupling agent (C). Although phosphoric acid improves corrosion resistance, a content exceeding 8% by mass causes the possibility of deterioration in storage stability. In addition, in use of hydrofluoric acid or fluoride, it is preferably mixed so that the fluorine content is 0.8% by mass or less relative to the total solid content of the resin compound (A), the cationic urethane (B), and the silane coupling agent (C). A fluorine content exceeding 0.8% by mass enhances etchability of a zinc-based coating, thereby decreasing the corrosion resistance at a processed portion. On the other hand, when pH is excessively decreased, ammonia water or an amine having a boiling point of 100° C. or less is preferred as an alkali component used for adjusting the pH to 4 to 5. The use of a strong alkali such as NaOH or KOH causes the formation of a gel due to pH shock or decreases the storage stability.

In the present invention, wax (W) can be contained in the surface treatment agent for the purpose of securing lubricity of the coating film. The wax (W) is preferably mixed so that the solid content of the wax (W) is 0.01 to 0.10 in terms of ratio by mass relative to the surface treatment coating film. When the content is 0.01 or more, lubricity becomes satisfactory, while when the content is 0.10 or less, lubricity can be secured, storage of the surface-treated steel sheet produced in the form of a coil causes no occurrence of coil crashing, and neither increase in cost nor decrease in corrosion resistance occurs. As the wax (W), at least one type of wax having a melting point of 70° C. to 120° C. is preferably used. Examples thereof include polyethylene wax, oxidized polyethylene wax, polypropylene wax, microcrystalline wax, and the like. With a melting point of 70° C. or more, lubricity can be imparted, and with a melting point of 120° C. or less, lubricity can be imparted without excessively high hardness. The wax (W) is preferably an emulsion prepared by dispersing it in water with an emulsifier, and preferably has a particle diameter of 0.08 to 0.30 μm. With a particle diameter of 0.08 μm or more, the effect of lubricity can be achieved, and the amount of the emulsifier used is not increased, thereby causing no deterioration in alkali resistance and paintability. On the other hand, the particle diameter is preferably 0.30 μm or less because floatation does not occur in the treatment agent due to a decrease in specific gravity of the wax (W), thereby causing excellent storage stability.

The water (F) used in the present invention preferably has a small influence on each of the components of the resin compound (A), the cationic urethane (B), the silane coupling agent (C), the organic titanium chelate compound (D), and the tetravalent vanadyl compound (E), and the acid component or alkali component used for pH adjustment. For example, hardness-increasing components such as Mg, Ca, and Si, which are contained as impurities in water, decrease the solubility and dispersibility of the resin compound (A) and the cationic urethane (B) of the present invention and thus may cause the occurrence of aggregates of (A) and (B). In addition, Na and Cl contained as impurities in water may decrease corrosion resistance or decrease coating adhesion when remaining in the coating film. Therefore, the water (F) used preferably contains small amounts of impurities and has, for example, an electric conductivity of less than 100 μS/cm. The electric conductivity is more preferably 50 μS/cm or less and most preferably 10 μS/cm or less.

If required, an antifoaming agent and a wettability improver may be added to the surface treatment agent used in the present invention. The type of the antifoaming agent is not particularly limited, and for example, a silicone-based or fatty acid-based emulsion type can be used. The wettability improver improves wettability of the hot-dip galvanized steel sheet by decreasing the surface tension of the surface treatment agent, improving appearance uniformity. Examples of the wettability improver include, but are not limited to, water-soluble solvents such as ethanol, T-butanol, butyl cellosolve, and the like. The wettability improver containing acetylene is also preferred because it also has an antifoaming effect. Further, for the purpose of improving blackening resistance, a nitrate such as nickel nitrate or ammonium nitrate may be added to the surface treatment agent used in the present invention. Although nitric acid gives a pH shock as described above, a nitrate does not give a pH shock.

<Method for Producing Hot-Dip Galvanized Steel Sheet Using Surface Treatment Agent>

(1) Roughness Imparting Step

The treatment base sheet is hot-dip galvanized by passing through a usual continuous hot-dip galvanization line and then temper-rolled to adjust the surface roughness of the galvanized steel sheet. In view of home appliance application, the coating weight of the galvanized coating on one side may be 5 $g/m^2$ or more because the use environment is not severe. The surface roughness after coating may be adjusted by controlling the temper rolling conditions such as the surface roughness of a temper rolling (skin pass) work roll installed after the coating step in the hot galvanization line, an elongation percentage, rolling oil, etc. The method for adjusting the surface roughness of the work roll is not particularly limited, but shot dull texturing, laser dull texturing, electro-discharge dull texturing, or the like can be applied.

The temper rolling is preferably performed using a work roll with Ra and PPI adjusted to 0.8 to 5 μm and 150 or more, respectively, by shot dull texturing, laser dull texturing, or electro-discharge dull texturing. The elongation percentage is preferably 0.5 to 1.5%. The temper rolling in either a dry manner or wet manner has no problem as long as roughness can be imparted.

As described above, the hot galvanized steel sheet having a Ra of 0.5 to 2.0 μm, a PPI of 150 or more, and a Wca of 0.5 μm or less is produced.

(2) Step of Forming Surface Treatment Coating Film

The surface treatment agent is applied to the hot-dip galvanized steel sheet imparted with roughness as described above and then dried at an ultimate sheet temperature of 50° C. to 180° C. to form a chemical conversion coating on the galvanized surface. The surface treatment coating film is preferably formed on the surface of the steel sheet with a coating weight of 0.2 to 1.0 $g/m^2$ per one side. With a coating weight of less than 0.2 $g/m^2$, satisfactory corrosion resistance is not obtained, while with a coating weight exceeding 1.0 $g/m^2$, the coating weight is saturated, thereby causing an economic disadvantage and decreasing paintability and conductivity. As the method of applying the surface treatment agent of the present invention to the galvanized steel sheet, any one of a roll coater (three-roll system, two-roll system, or the like), a squeeze coater, and a die coater may be used. In addition, after application with the squeeze coater or the like, dipping, or spraying, an air knife method or a roll drawing method can be performed to adjust the coating amount and make a uniform surface appearance and a uniform thickness.

After the galvanized steel sheet is coated (application) with the surface treatment agent, the surface treatment agent is dried by heating preferably without water washing. As the drying method, a drier, an air-heating furnace, a high-frequency induction heating furnace, and an infrared furnace can be used. The drying is performed at the ultimate sheet temperature of the galvanized steel sheet within the range of 50° C. to 180° C. The ultimate sheet temperature of lower than 50° C. allows a large amount of water to remain in the coating film, and thus unsatisfactory corrosion resistance is exhibited. The ultimate sheet temperature exceeding 180° C. is uneconomical and makes the coating film hard and brittle, and thus corrosion resistance at a processed portion is decreased.

The galvanized steel sheet of the present invention which has the surface treatment coating film formed by the above-described method can be imparted with higher corrosion resistance by further coating the surface with a resin coating film.

In addition, the surface treatment coating film formed with the surface treatment agent of the present invention may be formed on one or both of the surfaces of the galvanized steel sheet.

<Operation of the Present Invention>

Figure 2:
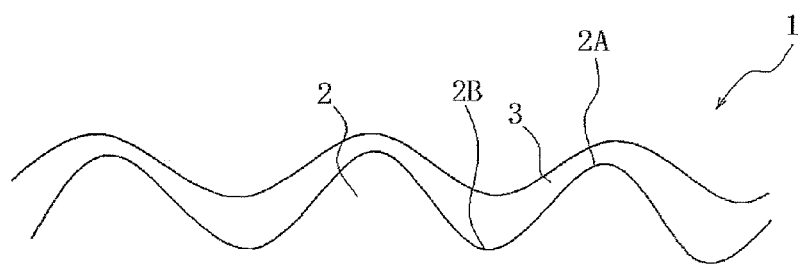
FIG. 2 is a drawing schematically showing an irregular shape of a hot-dip galvanized steel sheet produced in an embodiment of the present invention.

The function advantages of the above-described definition of roughness of the galvanized surface are as described above. In the present invention, the significant effect that conductivity can be more improved, and corrosion resistance is not impaired is first exhibited by forming, with the surface treatment agent, the surface treatment coating film on the hot-dip galvanized steel sheet having the above-described surface roughness. The inventors suppose that this effect is due to the following action: The surface treatment agent used in the present invention has low reactivity to the galvanized surface and thus forms a surface treatment film which is thin on projecting portions 2A and thick on recessed portions 2B of the galvanized surface 2 having roughness as shown in FIG. 2. The thin coating 3 on the projecting portions 2A improves conductivity. In this case, corrosion resistance is generally liable to be degraded on the projecting portions. However, the surface treatment agent used in the present invention is a surface treatment agent mainly containing a silane coupling agent and thus can form a dense coating film by polysiloxane, thereby achieving sufficient corrosion resistance even when the coating film formed is thin on the projecting portions 2A.

Next, each of the components of the surface treatment agent is supposed to have the following function, but the present invention is not limited to these suppositions. The surface treatment agent of the present invention contains the resin compound (A), the cationic urethane (B), and the silane coupling agent (C) as main components, which form the skeleton of the coating film.

By adjusting, to a weak acidic value, the pH of the surface treatment agent containing the resin compound (A) having a cationic functional group (general formula (II) or (III)), the surface treatment agent is increased in stability, securing storage stability. In addition, by imparting cationy, the resin compound (A) is made insoluble in an alkali, and thus the coating film has alkali resistance. Further, when bisphenol is selected as a phenol skeleton of the resin compound (A), the resin compound (A) is made slightly soluble in a polar solvent (imparted with solvent resistance), thereby improving adhesion and corrosion resistance.

However, the resin compound (A) is liable to be tinged with yellow by heating (decreased in yellowing resistance) and easily forms a hard coating film. Therefore, by mixing the cationic urethane (B), the phenol resin is softened, and corrosion resistance is secured at a processed portion.

While the cationic urethane (B) has the above-described effect, the coating is made easy to peel with a polar solvent. Therefore, in order to secure solvent resistance (to a polar solvent) and yellowing resistance, the silane coupling agent (C) is mixed. The silane coupling agent (C) produces an active silanol group (Si—OH) by hydrolysis of a terminal alkoxy group and thus contributes to improvement in adhesion to a base material (galvanized steel sheet) and an upper coating film. Further, the silane coupling agent (C) is partially dehydrated and condensed to produce a siloxane bond (Si—O—Si) which is continuously polymerized (forming a polysiloxane polymer: —Si—O—Si—O—Si—). As a result, a very stable structure is formed, and thus corrosion resistance, solvent resistance, and yellowing resistance can be imparted to the coating film.

As described above, it is considered that the resin compound (A), the cationic urethane (B), and the silane coupling agent (C) are used as the main components at an appropriate ratio so that various performances can be achieved with a good balance. However, the problems newly recognized in the present invention as well as the conventional problems cannot be satisfactorily resolved only by the main components. In order to resolve these problems, the surface treatment agent of the present invention contains, as essential components, the organic titanium chelate compound (D) besides the main components. The organic titanium chelate compound (D) is supposed to function as a catalyst which promotes the formation of polysiloxane when the surface treatment agent is dried to form the coating film. Consequently, the alkali resistance of the coating film is remarkably improved, and corrosion resistance after alkaline degreasing, solvent resistance, and paintability are also improved.

In order to achieve this effect, the organic titanium chelate compound (D) is required at a predetermined content which is determined depending on the content of the silane coupling agent (C). With the organic titanium chelate compound (D) at a low content, the desired effect cannot be achieved, while at an excessively high content, the coating film is made hard and brittle due to an excessive increase in amount of polysiloxane, thereby decreasing the corrosion resistance at a processed portion. In addition, the formation of polysiloxane with the organic titanium chelate compound (D) is ideally promoted during the formation of the coating film. However, the formation of polysiloxane with the organic titanium chelate compound (D) is also promoted during storage of the surface treatment agent. Therefore, at an excessively high content, storage stability (suppression of thickening and gelling) is decreased, and thus the same quality cannot be obtained before and after storage.

In addition, the surface treatment agent of the present invention further contains the tetravalent vanadyl compound (E) as an essential component. In the present invention, the tetravalent vanadyl compound (E) is supposed to function as a corrosion inhibitor (e.g., passivation of zinc). In particular, vanadyl ions ($VO^{2+}$) having one oxygen atom is little eluted in a wet environment and exhibits the inhibitor effect while remaining in the coating film. Therefore, it is supposed that when the galvanized steel sheet is subjected to strong processing such as bending, a portion having ductile damage to the surface treatment coating film and the galvanized surface is improved in corrosion resistance and corrosion resistance after alkaline degreasing. The inventors suppose that such an effect is achieved by synergic effect with Ti present as cation on the assumption that the coating film has a proper skeleton having a cationic functional group.

EXAMPLES

Example 1

A galvanized coating film was formed on a steel sheet by hot-dip galvanization, and then the steel sheet was temper-rolled with an electro-discharge roll having a Ra of 2.1 μm and a PPI of 250 under the conditions of an elongation percentage of 1% and nonuse of rolling oil so as to adjust the roughness of the galvanized surface to a Ra of 0.7 m and a PPI of 170, thereby forming a galvanized steel sheet shown in Table 7.

A resin compound (a) shown in Table 1 (Tables 1a and 1b), urethane (b) shown in Table 2, a silane coupling agent (c) shown in Table 3, a titanium compound (d) shown in Table 4, a vanadium compound (e) shown in Table 5, and wax (w) emulsion shown in Table 6 were appropriately mixed to prepare a surface treatment agent. Specifically, the surface treatment agent was prepared so as to have each of the compositions shown in Tables 8 and adjusted to pH shown in Tables 8 using phosphoric acid, acetic acid, formic acid, hydrofluoric acid, or fluoride as an acid component and ammonia as an alkali component. Then, the surface treatment agent was adjusted with deionized water so that the solid content after drying at 110° C. for 2 hours was 10% by mass. For all other surface treatment agents, pH was adjusted with acetic acid and ammonia, and the drying solid content was adjusted to 10% by mass. As the deionized water, ion exchange water with an electric conductivity of 10 μS/cm was used.

Each of the surface treatment agents shown in Tables 8 was applied using a roll coater to one of the surfaces of the galvanized steel sheet with galvanized surface roughness adjusted to a Ra of 0.7 μm and a PPI of 170, and then dried by heating at each of the temperatures shown in Tables 8 without water washing to produce a galvanized steel sheet having a surface treatment coating film. The coating weight of the surface treatment coating film on one side was adjusted by controlling the solid content (heating residue) of the surface treatment agent or application conditions (rolling force, roll rotational speed, etc.). The coating weight was determined by calculation from Si of the silane coupling agent (C) quantitatively measured with a fluorescent X-ray analyzer.

The surface appearance, conductivity, and corrosion resistance of the resultant galvanized steel sheets were evaluated. With respect to corrosion resistance, corrosion resistance at a plane portion, corrosion resistance at a bend portion, and corrosion resistance after alkaline degreasing were evaluated. Further, each of heat discoloration resistance, paintability, paintability after alkaline degreasing, solvent resistance, storage stability, and lubricity was testes. The results are shown in Tables 8. The quality performance was evaluated under conditions described below.

(1) Surface Appearance

The surface appearance of each sample was evaluated by visual observation. Evaluation criteria were as follows:
Circle: Good appearance
Triangle: Slight irregularities/spangle pattern
Cross: Clear irregularities/spangle pattern (2) Conductivity Conductivity of each sample was measured according to JIS K7194: 1994 using Loresta GP (manufactured by Mitsubishi Chemical Corporation) as an apparatus and ASP probe as a probe. Measurement was performed at 10 points and the probability of showing 0.1 mΩ or less was defined as a rate of conductivity development. Evaluation criteria were as follows:
Circle: Rate of conductivity development of 100%
Triangle: Rate of conductivity development of 50% or more and less than 100%
Cross: Rate of conductivity development of less than 50%

(3) Corrosion Resistance

A salt spray test (JIS-Z-2371-2000) was conduced for each sample and a rate of white rust occurrence area was evaluated after the lapse of 72 hours. Evaluation criteria were as follows:
Double circle: Rate of white rust occurrence area of less than 5%
Circle: Rate of white rust occurrence area of 5% or more and less than 30%
Triangle: Rate of white rust occurrence area of 30% or more and less than 50%
Cross: Rate of white rust occurrence area of 50% or more (4) Corrosion Resistance at Processed Portion Each sample was bent at 180° so as to hold a bar (stainless bar) having a diameter of 2 mm and gripped with a vice. A salt spray test (JIS-Z-2371-2000) was conduced for the bend sample and a state of white rust occurrence on the outer (surface) side of the bend portion was evaluated after the lapse of 24 hours. Evaluation criteria were as follows:
Double circle: Rate of white rust occurrence area of less than 5%
Circle: Rate of white rust occurrence area of 5% or more and less than 30%
Triangle: Rate of white rust occurrence area of 30% or more and less than 50%
Cross: Rate of white rust occurrence area of 50% or more (5) Corrosion Resistance after Alkaline Degreasing Alkaline degreasing agent CL-N364S (manufactured by Nihon Parkerizing Co., Ltd.) was dissolved at a concentration of 20 g/l in pure water and heated to 60° C. Each sample was immersed in the resultant alkaline solution for 2 minutes, taken out, washed with water, and then dried. A salt spray test (JIS-Z-2371-2000) was conduced for each sample and a rate of white rust occurrence area was evaluated after the lapse of 72 hours. Evaluation criteria were as described above in (3).

(6) Heat Discoloration Resistance

Each sample was heated to a sheet temperature of 500° C. over 30 seconds in an infrared image furnace, maintained for 30 seconds, and then allowed to naturally cool to room temperature. In this state, the surface appearance was visually observed. Evaluation criteria were as follows:
Double circle: No discoloration
Circle: Very slight tinge of brown
Triangle: Discoloration to light brown
Cross: Discoloration to brown (7) Paintability Each sample was painted with Dericon (registered trade name) #700 (manufactured by Dai-Nippon Paint Co., Ltd.), which was a melamine alkyd-type paint, and then baked at 130° C. for 30 minutes to form a coating film with a thickness of 30 μm. Then, the sample was immersed in boiling water for 2 hours and immediately cut, up to the steel base, in a grid pattern (10×10 squares, 1 mm interval). Further, the sample was extruded by 5 mm with an Erichsen extruder in such a manner that the cut portion faced outward (surface side) and subjected to adhesion and peeling of an adhesive tape to measure a peeled area of the coating film. Evaluation criteria were as described below. The Erichsen extrusion conditions were a punch diameter of 20 mm, a die diameter of 27 mm, and a drawing width of 27 mm according to JIS-Z-2247-2006.

Double circle: No peeling
Circle with plus: Peeled area of less than 3%
Circle: Peeled area of 3% or more and less than 10%
Circle with minus: Peeled area of 10% or more and less than 20%
Triangle: Peeled area of 20% or more and less than 50%
Cross: Peeled area of 50% or more (8) Paintability after Alkaline Degreasing After alkaline degreasing was performed by the same method as described above in (5), each sample was subjected to the same paintability test as described above in (7). Evaluation criteria were also the same as in (7).

(9) Solvent Resistance

A gauze having a surface impregnated with methanol was pressed on a surface of each sample by applying a load of 4.90 N (500 gf) and the sample was rubbed with the gauze for 10 roundtrips under the load applied. Rubbing marks were evaluated by visual observation. Evaluation criteria were as follows:

Double circle: No mark was observed.
Circle with plus: No mark was observed from above, but marks were slightly observed from an oblique direction.
Circle: No mark was observed from above, but marks were clearly observed from an oblique direction.
Circle with minus: Marks were slightly observed from above.
Triangle: Marks were clearly observed from above.
Cross: The coating film was peeled.

(10) Storage Stability

Each of the surface treatment agents shown in Tables 8 was stored in a constant-temperature bath of 40° C. for 30 days. Each surface treatment agent was taken out and then the appearance thereof was evaluated by visual observation. Evaluation criteria were as described below. Further, a galvanized steel sheet having a surface treatment coating film formed with each of the surface treatment agents stored under the above-described conditions was tested as described above in (3) to (5).

Double circle: No change
Circle: Trace amount of precipitates
Triangle: Small amount of precipitates or slight increase in viscosity
Cross: Large amount of precipitates or gelling

(11) Lubricity

A disk-shaped test piece having a diameter of 100 mm was cut out from each sample and formed into a cup shape under the conditions including a punch diameter of 50 mm, a die diameter of 51.91 mm, and a blank holding force of 1 ton. The appearance of the drawn surface (outside of the side surface of a cup) of the formed product was examined by visual observation to evaluate a degree of flawing and a degree of blackening. Evaluation criteria were as follows:

Double circle: Substantially no change was observed over the entire surface and the appearance was uniform.
Circle with plus: Slight blackening occurred but the appearance was uniform.
Circle: Slight flawing and blackening occurred and the appearance was clearly nonuniform.
Circle with minus: Flawing and blackening locally occurred and the appearance was clearly nonuniform.
Triangle: Flawing and blackening significantly occurred mainly at corners.
Cross: Cracked and unable to be formed.

TABLE 1a

| | Resin compound (a) | | | | | |
|---|---|---|---|---|---|---|
| | Z group: general formula (II) | | | | Average number of | |
| | Y1 | | Y2 | | Z groups | |
| No. | R1 | R2 | R1 | R2 | substituted | n |
| A1 | Hydrogen | Hydrogen | Methyl | Ethyl | 0.4 | 5 |
| A2 | Ethyl | Methyl | Hydrogen | Propyl | 0.7 | 3 |
| A3 | Ethyl | Propyl | Hydrogen | Ethyl | 0.4 | 10 |
| A4 | Hydroxyethyl | Hydroxyethyl | Hydroxyethyl | Hydroxyethyl | 0.5 | 5 |
| A5 | Hydrogen | Hydrogen | Methyl | Ethyl | 0.1 | 5 |
| A6 | Hydrogen | Hydrogen | Methyl | Ethyl | 1.2 | 5 |
| A7 | Hydrogen | Hydrogen | Methyl | Ethyl | 0.4 | 80 |
| A8 | —$C_{12}H_{23}$ | Methyl | Hydrogen | Hydrogen | 0.5 | 5 |
| A9 | Hydroxyethyl | Hydroxyethyl | Hydroxyethyl | Hydroxyethyl | 0.1 | 5 |
| A10 | Hydroxyethyl | Hydroxyethyl | Hydroxyethyl | Hydroxyethyl | 1.2 | 5 |
| A11 | Hydroxyethyl | Hydroxyethyl | Hydroxyethyl | Hydroxyethyl | 0.5 | 70 |
| A12 | —$C_{12}H_{22}OH$ | Methyl | Hydrogen | Hydrogen | 0.5 | 5 |

※A group represented by general formula (II) was used as Z group.

TABLE 1b

| | Resin compound (a) | | | | | | |
|---|---|---|---|---|---|---|---|
| | Z group: general formula (III) | | | | | Average number of | |
| | Y1 | | | Y2 | | | Z groups |
| No. | R3 | R4 | R5 | R3 | R4 | R5 | substituted | n |
| A13 | Hydrogen | Hydrogen | Methyl | Methyl | Ethyl | Methyl | 0.4 | 5 |
| A14 | Ethyl | Methyl | Hydrogen | Hydrogen | Propyl | Hydrogen | 0.7 | 3 |
| A15 | Ethyl | Propyl | Methyl | Hydrogen | Ethyl | Methyl | 0.4 | 10 |

TABLE 1b-continued

Resin compound (a)

| | Z group: general formula (III) | | | | | | Average number of Z groups substituted | n |
|---|---|---|---|---|---|---|---|---|
| | Y1 | | | Y2 | | | | |
| No. | R3 | R4 | R5 | R3 | R4 | R5 | | |
| A16 | Hydroxyethyl | Hydroxyethyl | Hydrogen | Hydroxyethyl | Hydroxyethyl | Hydrogen | 0.5 | 5 |
| A17 | Hydrogen | Hydrogen | Methyl | Methyl | Ethyl | Methyl | 0.1 | 5 |
| A18 | Hydrogen | Hydrogen | Methyl | Methyl | Ethyl | Methyl | 1.2 | 5 |
| A19 | Hydrogen | Hydrogen | Methyl | Methyl | Ethyl | Methyl | 0.4 | 80 |
| A20 | —$C_{12}H_{23}$ | Methyl | Hydrogen | Hydrogen | Hydrogen | Hydrogen | 0.5 | 5 |
| A21 | Hydroxyethyl | Hydroxyethyl | Hydrogen | Hydroxyethyl | Hydroxyethyl | Hydrogen | 0.1 | 5 |
| A22 | Hydroxyethyl | Hydroxyethyl | Hydrogen | Hydroxyethyl | Hydroxyethyl | Hydrogen | 1.2 | 5 |
| A23 | Hydroxyethyl | Hydroxyethyl | Hydrogen | Hydroxyethyl | Hydroxyethyl | Hydrogen | 0.5 | 70 |
| A24 | —$C_{12}H_{22}OH$ | Methyl | Hydrogen | Hydrogen | Hydrogen | Hydrogen | 0.5 | 5 |

※ A group represented by general formula (III) was used as Z group.

TABLE 2

Urethane resin (b)

| No. | Urethane resin (b) | Ionicity | Manufacturer |
|---|---|---|---|
| B1 | Adeka Bontiter HUX-670 | Cation | ADEKA Corporation |
| B2 | Superflex 600 | Cation | Dai-ichi Kogyo Seiyaku Co., Ltd. |
| B3 | Vermarine UC-20 | Cation | Sanyo Chemical Industries, Ltd. |
| B4 | Adeka Bontiter UX-206 | Nonion | ADEKA Corporation |
| B5 | Hydran AP-10 | Anion | DIC Corporation |

TABLE 3

Silane coupling agent (c)

| No. | Silane coupling agent (c) |
|---|---|
| C1 | 3-Mercaptopropyltrimethoxysilane |
| C2 | N-(2-aminoethyl)-3-aminopropyltrimethoxysilane |
| C3 | 3-Glycidoxypropyltrimethoxysilane |
| C4 | 3-Methacryloxypropyltrimethoxysilane |
| C5 | Vinyltrimethoxysilane |

TABLE 4

Titanium compound (d)

| No. | Ti compound (d) |
|---|---|
| D1 | Titanium acetylacetonate (Ti: 12.5%) |
| D2 | tatanium tetraacetylacetonate (Ti: 10.8%) |
| D3 | Titanium nitrate (Ti: 16.2%) |
| D4 | Titanium hydrofluoride (Ti: 29.2%) |

TABLE 5

Vanadium compound (e)

| No. | V compound (e) |
|---|---|
| E1 | Vanadyl oxalate (V: 32.9%) |
| E2 | Vanadyl acetylaceonate (V: 19.2%) |
| E3 | Vanadyl sulfate (V: 31.2%) |
| E4 | Ammonium metavanadate (V: 43.5%) |

TABLE 6

Wax (w) emulsion

| No. | Wax type (w) | Melting point (°C.) | Solic content of dispersion (%) | Particle diameter (μm) |
|---|---|---|---|---|
| W1 | Oxidized polyethylene wax | 115 | 20 | 0.1 |
| W2 | Microcrystalline wax | 90 | 20 | 0.1 |
| W3 | Paraffin wax | 50 | 20 | 0.1 |

※ The wax used was forcedly emulsified with an emulsifier.

TABLE 7

Galvanized steel sheet

| No. | Galvanized steel sheet | Coating weight (g/m2) |
|---|---|---|
| GI | Hot-dip galvanized steel sheet | 45 |
| GF | Zn—5 mass % Al—0.5 mass % Mg alloy hot-dip galvanized steel sheet | 45 |
| GL | Zn—5.5 mass % Al alloy hot-dip galvanized steel sheet | 45 |

※ Coating was performed on both surfaces, but the coating weight on one side is shown.

TABLE 8-1

| | | (a) | | (b) | | (c) | | (d) | | (e) | | (w) | | Others | |
|---|---|---|---|---|---|---|---|---|---|---|---|---|---|---|---|
| No. | | Type Table 1 | Partb by mass | Type Table 2 | Parts by mass | Type Table 3 | Parts by mass | Type Table 4 | Parts by mass*1) | Type Table 5 | Parts by mass*2) | Type Table 6 | Ratio by mass*3) | Type | Parts by mass |
| 1 | Invention Example 1 | A1 | 4 | B1 | 16 | C1 | 60 | D1 | 1 | E1 | 0.4 | — | 0 | — | 0 |
| 2 | Invention Example 2 | A1 | 10 | B1 | 10 | C1 | 60 | D1 | 1 | E1 | 0.4 | — | 0 | — | 0 |
| 3 | Invention Example 3 | A1 | 11 | B1 | 9 | C1 | 60 | D1 | 1 | E1 | 0.4 | — | 0 | — | 0 |
| 4 | Comparative Example 1 | A1 | 14 | B1 | 6 | C1 | 60 | D1 | 1 | E1 | 0.4 | — | 0 | — | 0 |
| 5 | Invention Example 4 | A1 | 0.5 | B1 | 19.5 | C1 | 60 | D1 | 1 | E1 | 0.4 | — | 0 | — | 0 |
| 6 | Invention Example 5 | A1 | 0.5 | B1 | 21.5 | C1 | 58 | D1 | 1 | E1 | 0.4 | — | 0 | — | 0 |

TABLE 8-1-continued

| No. | | (a) Type Table 1 | Parts by mass | (b) Type Table 2 | Parts by mass | (c) Type Table 3 | Parts by mass | (d) Type Table 4 | Parts by mass*1) | (e) Type Table 5 | Parts by mass*2) | (w) Type Table 6 | Ratio by mass*3) | Others Type | Parts by mass |
|---|---|---|---|---|---|---|---|---|---|---|---|---|---|---|---|
| 7 | Invention Example 6 | A1 | 0.5 | B1 | 23.5 | C1 | 56 | D1 | 1 | E1 | 0.4 | — | 0 | — | 0 |
| 8 | Comparative Example 2 | A1 | 0.1 | B1 | 25.9 | C1 | 55 | D1 | 1 | E1 | 0.4 | — | 0 | — | 0 |
| 9 | Comparative Example 3 | A1 | 4 | B1 | 16 | C1 | 60 | D3 | 1 | E1 | 0.4 | — | 0 | — | 0 |
| 10 | Comparative Example 4 | A1 | 4 | B1 | 16 | C1 | 60 | D4 | 1 | E1 | 0.4 | — | 0 | — | 0 |
| 11 | Comparative Example 5 | A1 | 4 | B1 | 16 | C1 | 60 | D1 | 1 | — | 0 | — | 0 | — | 0 |
| 12 | Comparative Example 6 | A1 | 4 | B1 | 16 | C1 | 60 | D1 | 1 | E4 | 0.4 | — | 0 | — | 0 |
| 13 | Comparative Example 7 | A1 | 29 | B1 | 6 | C1 | 65 | D4 | 1.134 | — | 0 | — | 0 | Nitric acid | 10 |
| 14 | Comparative Example 8 | A1 | 29 | B1 | 6 | C1 | 65 | D4 | 1.134 | — | 0 | — | 0 | Ortho-phosphoric acid | 10 |
| 15 | Comparative Example 9 | A1 | 20 | B1 | 40 | C2:C3 = 1:1 | 20 | D4 | 1 | E1 | 0.4 | — | 0 | — | 0 |
| 16 | Invention Example 7 | A2 | 4 | B1 | 16 | C2 | 60 | D1 | 1 | E2 | 0.4 | — | 0 | — | 0 |
| 17 | Invention Example 8 | A3 | 4 | B1 | 16 | C2 | 60 | D2 | 1 | E3 | 0.4 | — | 0 | — | 0 |
| 18 | Invention Example 9 | A1 | 4 | B1 | 19 | C2:C3 = 1:1 | 60 | D1 | 1 | E3 | 0.4 | — | 0 | — | 0 |
| 19 | Comparative Example 10 | A1 | 19 | B1 | 19 | C1 | 45 | D1 | 0.75 | E2 | 0.3 | — | 0 | — | 0 |
| 20 | Invention Example 10 | A1 | 12 | B1 | 19 | C1 | 52 | D1 | 0.85 | E2 | 0.34 | — | 0 | — | 0 |
| 21 | Invention Example 11 | A1 | 4 | B1 | 11 | C1 | 68 | D1 | 1.1 | E2 | 0.44 | — | 0 | — | 0 |
| 22 | Comparative Example 11 | A1 | 1 | B1 | 10 | C1 | 72 | D1 | 1.2 | E2 | 0.48 | — | 0 | — | 0 |
| 23 | Comparative Example 12 | A1 | 4 | B1 | 16 | C1 | 60 | D1 | 0.8 | E2 | 0.32 | — | 0 | — | 0 |
| 24 | Invention Example 12 | A1 | 4 | B1 | 16 | C1 | 60 | D1 | 0.88 | E2 | 0.35 | — | 0 | — | 0 |
| 25 | Invention Example 13 | A1 | 4 | B1 | 16 | C1 | 60 | D1 | 1.15 | E2 | 0.46 | — | 0 | — | 0 |
| 26 | Comparative Example 13 | A1 | 4 | B1 | 16 | C1 | 60 | D1 | 1.25 | E2 | 0.5 | — | 0 | — | 0 |
| 27 | Comparative Example 14 | A1 | 4 | B1 | 16 | C1 | 60 | D1 | 1 | E2 | 0.24 | — | 0 | — | 0 |
| 28 | Invention Example 14 | A1 | 4 | B1 | 16 | C1 | 60 | D1 | 1 | E2 | 0.33 | — | 0 | — | 0 |
| 29 | Invention Example 15 | A1 | 4 | B1 | 16 | C1 | 60 | D1 | 1 | E2 | 0.49 | — | 0 | — | 0 |
| 30 | Comparative Example 15 | A1 | 4 | B1 | 16 | C1 | 60 | D1 | 1 | E2 | 0.55 | — | 0 | — | 0 |
| 31 | Invention Example 16 | A1 | 4 | B1 | 16 | C1 | 60 | D1 | 1 | E2 | 0.4 | W1 | 0.06 | — | 0 |
| 32 | Invention Example 17 | A1 | 4 | B1 | 16 | C1 | 60 | D1 | 1 | E2 | 0.4 | W2 | 0.06 | — | 0 |
| 33 | Invention Example 18 | A1 | 4 | B1 | 16 | C1 | 60 | D1 | 1 | E2 | 0.4 | W3 | 0.06 | — | 0 |
| 34 | Invention Example 19 | A1 | 4 | B1 | 16 | C1 | 60 | D1 | 1 | E2 | 0.4 | W1 | 0.1 | — | 0 |
| 35 | Invention Example 20 | A1 | 4 | B1 | 16 | C1 | 60 | D1 | 1 | E2 | 0.4 | W1 | 0.01 | — | 0 |
| 36 | Comparative Example 21 | A1 | 4 | B1 | 16 | C1 | 60 | D1 | 1 | E1 | 0.4 | — | 0 | — | 0 |
| 37 | Comparative Example 17 | A1 | 4 | B1 | 16 | C1 | 60 | D1 | 1 | E1 | 0.4 | — | 0 | — | 0 |
| 38 | Invention Example 21 | A1 | 4 | B1 | 16 | C1 | 60 | D1 | 1 | E1 | 0.4 | — | 0 | — | 0 |
| 39 | Invention Example 22 | A1 | 4 | B1 | 16 | C1 | 60 | D1 | 1 | E1 | 0.4 | — | 0 | — | 0 |

TABLE 8-2

| No. | | (a) Type Table 1 | Parts by mass | (b) Type Table 2 | Parts by mass | (c) Type Table 3 | Parts by mass | (d) Type Table 4 | Parts by mass*1) | (e) Type Table 5 | Parts by mass*2) | (w) Type Table 6 | Ratio by mass*3) | Others Type | Parts by mass |
|---|---|---|---|---|---|---|---|---|---|---|---|---|---|---|---|
| 40 | Comparative Example 18 | A1 | 4 | B1 | 16 | C1 | 60 | D1 | 1 | E1 | 0.4 | — | 0 | — | 0 |
| 41 | Comparative Example 19 | A1 | 4 | B1 | 16 | C1 | 60 | D1 | 1 | E1 | 0.4 | — | 0 | — | 0 |
| 42 | Comparative Example 20 | A1 | 4 | B1 | 16 | C1 | 60 | D1 | 1 | E1 | 0.4 | — | 0 | — | 0 |
| 43 | Invention Example 23 | A1 | 4 | B1 | 16 | C1 | 60 | D1 | 1 | E1 | 0.4 | — | 0 | — | 0 |
| 44 | Invention Example 24 | A1 | 4 | B1 | 16 | C1 | 60 | D1 | 1 | E1 | 0.4 | — | 0 | — | 0 |
| 45 | Comparative Example 21 | A1 | 4 | B1 | 16 | C1 | 60 | D1 | 1 | E1 | 0.4 | — | 0 | — | 0 |
| 46 | Comparative Example 22 | A1 | 4 | B1 | 16 | C1 | 60 | D1 | 1 | E1 | 0.4 | — | 0 | — | 0 |
| 47 | Invention Example 25 | A1 | 4 | B1 | 16 | C1 | 60 | D1 | 1 | E1 | 0.4 | — | 0 | — | 0 |
| 48 | Invention Example 26 | A1 | 4 | B1 | 16 | C1 | 60 | D1 | 1 | E1 | 0.4 | — | 0 | — | 0 |
| 49 | Comparative Example 23 | A1 | 4 | B1 | 16 | C1 | 60 | D1 | 1 | E1 | 0.4 | — | 0 | — | 0 |
| 50 | Invention Example 27 | A4 | 4 | B1 | 16 | C1 | 60 | D1 | 1 | E1 | 0.4 | — | 0 | — | 0 |
| 51 | Comparative Example 23 | A5 | 4 | B1 | 16 | C1 | 60 | D1 | 1 | E1 | 0.4 | — | 0 | — | 0 |
| 52 | Comparative Example 24 | A6 | 4 | B1 | 16 | C1 | 60 | D1 | 1 | E1 | 0.4 | — | 0 | — | 0 |
| 53 | Comparative Example 25 | A7 | 4 | B1 | 16 | C1 | 60 | D1 | 1 | E1 | 0.4 | — | 0 | — | 0 |
| 54 | Comparative Example 26 | A8 | 4 | B1 | 16 | C1 | 60 | D1 | 1 | E1 | 0.4 | — | 0 | — | 0 |
| 55 | Comparative Example 27 | A9 | 4 | B1 | 16 | C1 | 60 | D1 | 1 | E1 | 0.4 | — | 0 | — | 0 |
| 56 | Comparative Example 28 | A10 | 4 | B1 | 16 | C1 | 60 | D1 | 1 | E1 | 0.4 | — | 0 | — | 0 |
| 57 | Comparative Example 29 | A11 | 4 | B1 | 16 | C1 | 60 | D1 | 1 | E1 | 0.4 | — | 0 | — | 0 |
| 58 | Comparative Example 30 | A12 | 4 | B1 | 16 | C1 | 60 | D1 | 1 | E1 | 0.4 | — | 0 | — | 0 |
| 59 | Invention Example 28 | A13 | 4 | B1 | 16 | C1 | 60 | D1 | 1 | E1 | 0.4 | — | 0 | — | 0 |
| 60 | Invention Example 29 | A14 | 4 | B1 | 16 | C1 | 60 | D1 | 1 | E1 | 0.4 | — | 0 | — | 0 |
| 61 | Invention Example 30 | A15 | 4 | B1 | 16 | C1 | 60 | D1 | 1 | E1 | 0.4 | — | 0 | — | 0 |
| 62 | Invention Example 31 | A16 | 4 | B1 | 16 | C1 | 60 | D1 | 1 | E1 | 0.4 | — | 0 | — | 0 |
| 63 | Comparative Example 31 | A17 | 4 | B1 | 16 | C1 | 60 | D1 | 1 | E1 | 0.4 | — | 0 | — | 0 |

TABLE 8-2-continued

| No. | | (a) Type Table 1 | (a) Parts by mass | (b) Type Table 2 | (b) Parts by mass | (c) Type Table 3 | (c) Parts by mass | (d) Type Table 4 | (d) Parts by mass*1) | (e) Type Table 5 | (e) Parts by mass*2) | (w) Type Table 6 | (w) Ratio by mass*3) | Others Type | Others Parts by mass |
|---|---|---|---|---|---|---|---|---|---|---|---|---|---|---|---|
| 64 | Comparative Example 32 | A18 | 4 | B1 | 16 | C1 | 60 | D1 | 1 | E1 | 0.4 | — | 0 | — | 0 |
| 65 | Comparative Example 33 | A19 | 4 | B1 | 16 | C1 | 60 | D1 | 1 | E1 | 0.4 | — | 0 | — | 0 |
| 66 | Comparative Example 34 | A20 | 4 | B1 | 16 | C1 | 60 | D1 | 1 | E1 | 0.4 | — | 0 | — | 0 |
| 67 | Comparative Example 35 | A21 | 4 | B1 | 16 | C1 | 60 | D1 | 1 | E1 | 0.4 | — | 0 | — | 0 |
| 68 | Comparative Example 36 | A22 | 4 | B1 | 16 | C1 | 60 | D1 | 1 | E1 | 0.4 | — | 0 | — | 0 |
| 69 | Comparative Example 37 | A23 | 4 | B1 | 16 | C1 | 60 | D1 | 1 | E1 | 0.4 | — | 0 | — | 0 |
| 70 | Comparative Example 38 | A24 | 4 | B1 | 16 | C1 | 60 | D1 | 1 | E1 | 0.4 | — | 0 | — | 0 |
| 71 | Invention Example 32 | A1 | 4 | B2 | 16 | C1 | 60 | D1 | 1 | E1 | 0.4 | — | 0 | — | 0 |
| 72 | Invention Example 33 | A1 | 4 | B3 | 16 | C1 | 60 | D1 | 1 | E1 | 0.4 | — | 0 | — | 0 |
| 73 | Comparative Example 39 | A1 | 4 | B4 | 16 | C1 | 60 | D1 | 1 | E1 | 0.4 | — | 0 | — | 0 |
| 74 | Comparative Example 40 | A1 | 4 | B5 | 16 | C1 | 60 | D1 | 1 | E1 | 0.4 | — | 0 | — | 0 |
| 75 | Invention Example 34 | A1 | 4 | B1 | 16 | C4 | 60 | D1 | 1 | E1 | 0.4 | — | 0 | — | 0 |
| 76 | Comparative Example 41 | A1 | 4 | B1 | 16 | C5 | 60 | D1 | 1 | E1 | 0.4 | — | 0 | — | 0 |
| 77 | Invention Example 35 | A1 | 4 | B1 | 16 | C1 | 60 | D1 | 1 | E1 | 0.4 | — | 0 | — | 0 |

*1) Parts by mass in terms of Ti,,
*2) Parts by mass in terms of V,,
*3) Ratio by mass of wax relative to the total amount of the surface coating film excluidng the wax.

TABLE 8-3

| No. | | pH | (X1) | (X2) | (X3) | (X4) | Galvanized steel sheet | Drying temperature °C. | Coating weight g/m2 | Remarks |
|---|---|---|---|---|---|---|---|---|---|---|
| 1 | Invention Example 1 | 4.5 | 0.20 | 0.75 | 60 | 0.40 | GI | 100 | 0.5 | |
| 2 | Invention Example 2 | 4.5 | 0.13 | 0.75 | 60 | 0.40 | GI | 100 | 0.5 | |
| 3 | Invention Example 3 | 4.5 | 0.11 | 0.75 | 60 | 0.40 | GI | 100 | 0.5 | |
| 4 | Comparative Example 1 | 4.5 | 0.08 | 0.75 | 60 | 0.40 | GI | 100 | 0.5 | |
| 5 | Invention Example 4 | 4.5 | 0.24 | 0.75 | 60 | 0.40 | GI | 100 | 0.5 | |
| 6 | Invention Example 5 | 4.5 | 0.27 | 0.73 | 58 | 0.40 | GI | 100 | 0.5 | |
| 7 | Invention Example 6 | 4.5 | 0.29 | 0.70 | 56 | 0.40 | GI | 100 | 0.5 | |
| 8 | Comparative Example 2 | 4.5 | 0.32 | 0.68 | 55 | 0.40 | GI | 100 | 0.5 | |
| 9 | Comparative Example 3 | 4.5 | 0.20 | 0.75 | 60 | 0.40 | GI | 100 | 0.5 | |
| 10 | Comparative Example 4 | 4.5 | 0.20 | 0.75 | 60 | 0.40 | GI | 100 | 0.5 | |
| 11 | Comparative Example 5 | 4.5 | 0.20 | 0.75 | 60 | 0.00 | GI | 100 | 0.5 | |
| 12 | Comparative Example 6 | 4.5 | 0.20 | 0.75 | 60 | 0.40 | GI | 100 | 0.5 | |
| 13 | Comparative Example 7 | 4.5 | 0.06 | 0.65 | 57 | 0.00 | GI | 100 | 0.5 | Refer to Pat. No. 3,883,831 |
| 14 | Comparative Example 8 | 4.5 | 0.06 | 0.65 | 57 | 0.00 | GI | 100 | 0.5 | |
| 15 | Comparative Example 9 | 4.5 | 0.50 | 0.25 | 20 | 0.40 | GI | 100 | 0.5 | Refer to Japanese Unexamined Patent Application Publication No. 2006-152436 |
| 16 | Invention Example 7 | 4.5 | 0.20 | 0.75 | 60 | 0.40 | GI | 100 | 0.5 | |
| 17 | Invention Example 8 | 4.5 | 0.20 | 0.75 | 60 | 0.40 | GI | 100 | 0.5 | |
| 18 | Invention Example 9 | 4.5 | 0.23 | 0.72 | 60 | 0.40 | GF | 100 | 0.5 | |
| 19 | Comparative Example 10 | 4.5 | 0.23 | 0.54 | 60 | 0.40 | GI | 100 | 0.5 | |
| 20 | Invention Example 10 | 4.5 | 0.23 | 0.63 | 61 | 0.40 | GI | 100 | 0.5 | |
| 21 | Invention Example 11 | 4.5 | 0.13 | 0.82 | 62 | 0.40 | GI | 100 | 0.5 | |
| 22 | Comparative Example 11 | 4.5 | 0.12 | 0.87 | 60 | 0.40 | GI | 100 | 0.5 | |
| 23 | Comparative Example 12 | 4.5 | 0.20 | 0.75 | 75 | 0.40 | GI | 100 | 0.5 | |
| 24 | Invention Example 12 | 4.5 | 0.20 | 0.75 | 68 | 0.40 | GI | 100 | 0.5 | |
| 25 | Invention Example 13 | 4.5 | 0.20 | 0.75 | 52 | 0.40 | GI | 100 | 0.5 | |
| 26 | Comparative Example 13 | 4.5 | 0.20 | 0.75 | 48 | 0.40 | GI | 100 | 0.5 | |
| 27 | Comparative Example 14 | 4.5 | 0.20 | 0.75 | 60 | 0.24 | GI | 100 | 0.5 | |
| 28 | Invention Example 14 | 4.5 | 0.20 | 0.75 | 60 | 0.33 | GI | 100 | 0.5 | |
| 29 | Invention Example 15 | 4.5 | 0.20 | 0.75 | 60 | 0.49 | GI | 100 | 0.5 | |
| 30 | Comparative Example 15 | 4.5 | 0.20 | 0.75 | 60 | 0.55 | GI | 100 | 0.5 | |
| 31 | Invention Example 16 | 4.5 | 0.20 | 0.75 | 60 | 0.40 | GI | 100 | 0.5 | |
| 32 | Invention Example 17 | 4.5 | 0.20 | 0.75 | 60 | 0.40 | GI | 100 | 0.5 | |
| 33 | Invention Example 18 | 4.5 | 0.20 | 0.75 | 60 | 0.40 | GI | 100 | 0.5 | |
| 34 | Invention Example 19 | 4.5 | 0.20 | 0.75 | 60 | 0.40 | GI | 100 | 0.5 | |
| 35 | Invention Example 20 | 4.5 | 0.20 | 0.75 | 60 | 0.40 | GI | 100 | 0.5 | |
| 36 | Comparative Example 16 | 3.0 | 0.20 | 0.75 | 60 | 0.40 | GI | 100 | 0.5 | |
| 37 | Comparative Example 17 | 3.4 | 0.20 | 0.75 | 60 | 0.40 | GI | 100 | 0.5 | |
| 38 | Invention Example 21 | 4.0 | 0.20 | 0.75 | 60 | 0.40 | GI | 100 | 0.5 | |
| 39 | Invention Example 22 | 5.0 | 0.20 | 0.75 | 60 | 0.40 | GI | 100 | 0.5 | |

TABLE 8-4

| No. | | pH | (X1) | (X2) | (X3) | (X4) | Galvanized steel sheet | Drying temperature ° C. | Coating weight g/m2 | Remarks |
|---|---|---|---|---|---|---|---|---|---|---|
| 40 | Comparative Example 18 | 5.5 | 0.20 | 0.75 | 60 | 0.40 | Gl | 100 | 0.5 | |
| 41 | Comparative Example 19 | 6.0 | 0.20 | 0.75 | 60 | 0.40 | Gl | — | — | |
| 42 | Comparative Example 20 | 4.5 | 0.20 | 0.75 | 60 | 0.40 | Gl | 100 | 0.1 | |
| 43 | Invention Example 23 | 4.5 | 0.20 | 0.75 | 60 | 0.40 | Gl | 100 | 1.0 | |
| 44 | Invention Example 24 | 4.5 | 0.20 | 0.75 | 60 | 0.40 | Gl | 100 | 0.2 | |
| 45 | Comparative Example 21 | 4.5 | 0.20 | 0.75 | 60 | 0.40 | Gl | 100 | 1.3 | |
| 46 | Comparative Example 22 | 4.5 | 0.20 | 0.75 | 60 | 0.40 | Gl | 40 | 0.5 | |
| 47 | Invention Example 25 | 4.5 | 0.20 | 0.75 | 60 | 0.40 | Gl | 60 | 0.5 | |
| 48 | Invention Example 26 | 4.5 | 0.20 | 0.75 | 60 | 0.40 | Gl | 140 | 0.5 | |
| 49 | Comparative Example 23 | 4.5 | 0.20 | 0.75 | 60 | 0.40 | Gl | 220 | 0.5 | |
| 50 | Invention Example 27 | 4.5 | 0.20 | 0.75 | 60 | 0.40 | Gl | 100 | 0.5 | |
| 51 | Comparative Example 23 | 4.5 | 0.20 | 0.75 | 60 | 0.40 | Gl | — | — | |
| 52 | Comparative Example 24 | 4.5 | 0.20 | 0.75 | 60 | 0.40 | Gl | 100 | 0.5 | |
| 53 | Comparative Example 25 | 4.5 | 0.20 | 0.75 | 60 | 0.40 | Gl | 100 | 0.5 | |
| 54 | Comparative Example 26 | 4.5 | 0.20 | 0.75 | 60 | 0.40 | Gl | — | — | |
| 55 | Comparative Example 27 | 4.5 | 0.20 | 0.75 | 60 | 0.40 | Gl | — | — | |
| 56 | Comparative Example 28 | 4.5 | 0.20 | 0.75 | 60 | 0.40 | Gl | 100 | 0.5 | |
| 57 | Comparative Example 29 | 4.5 | 0.20 | 0.75 | 60 | 0.40 | Gl | 100 | 0.5 | |
| 58 | Comparative Example 30 | 4.5 | 0.20 | 0.75 | 60 | 0.40 | Gl | — | — | |
| 59 | Invention Example 28 | 4.5 | 0.20 | 0.75 | 60 | 0.40 | Gl | 100 | 0.5 | |
| 60 | Invention Example 29 | 4.5 | 0.20 | 0.75 | 60 | 0.40 | Gl | 100 | 0.5 | |
| 61 | Invention Example 30 | 4.5 | 0.20 | 0.75 | 60 | 0.40 | Gl | 100 | 0.5 | |
| 62 | Invention Example 31 | 4.5 | 0.20 | 0.75 | 60 | 0.40 | Gl | 100 | 0.5 | |
| 63 | Comparative Example 31 | 4.5 | 0.20 | 0.75 | 60 | 0.40 | Gl | — | — | |
| 64 | Comparative Example 32 | 4.5 | 0.20 | 0.75 | 60 | 0.40 | Gl | 100 | 0.5 | |
| 65 | Comparative Example 33 | 4.5 | 0.20 | 0.75 | 60 | 0.40 | Gl | 100 | 0.5 | |
| 66 | Comparative Example 34 | 4.5 | 0.20 | 0.75 | 60 | 0.40 | Gl | — | — | |
| 67 | Comparative Example 35 | 4.5 | 0.20 | 0.75 | 60 | 0.40 | Gl | — | — | |
| 68 | Comparative Example 36 | 4.5 | 0.20 | 0.75 | 60 | 0.40 | Gl | 100 | 0.5 | |
| 69 | Comparative Example 37 | 4.5 | 0.20 | 0.75 | 60 | 0.40 | Gl | 100 | 0.5 | |
| 70 | Comparative Example 38 | 4.5 | 0.20 | 0.75 | 60 | 0.40 | Gl | — | — | |
| 71 | Invention Example 32 | 4.5 | 0.20 | 0.75 | 60 | 0.40 | Gl | 100 | 0.5 | |
| 72 | Invention Example 33 | 4.5 | 0.20 | 0.75 | 60 | 0.40 | Gl | 100 | 0.5 | |
| 73 | Comparative Example 39 | 4.5 | 0.20 | 0.75 | 60 | 0.40 | Gl | — | — | |
| 74 | Comparative Example 40 | 4.5 | 0.20 | 0.75 | 60 | 0.40 | Gl | — | — | |
| 75 | Invention Example 34 | 4.5 | 0.20 | 0.75 | 60 | 0.40 | Gl | 100 | 0.5 | |
| 76 | Comparative Example 41 | 4.5 | 0.20 | 0.75 | 60 | 0.40 | Gl | 100 | 0.5 | |
| 77 | Invention Example 35 | 4.5 | 0.20 | 0.75 | 60 | 0.40 | GL | 100 | 0.5 | |

(※) X1 = (b)/(a + b + c), X2 = (c)/(a + b + c), X3 = (c)/Ti, X4 = V/Ti

TABLE 8-5

| No. | | Surface appearance (1) | Conductivity (2) | Corrosion resistance | | | Heat discoloration resistance (6) |
|---|---|---|---|---|---|---|---|
| | | | | (3) Plane portion | (4) Bend portion | (5) After degreasing | |
| 1 | Invention Example 1 | ○ | ○ | ◎ | ◎ | ◎ | ◎ |
| 2 | Invention Example 2 | ○ | ○ | ◎ | ○ | ◎ | ○ |
| 3 | Invention Example 3 | ○ | ○ | ◎ | ○ | ◎ | ○ |
| 4 | Comparative Example 1 | ○ | ○ | ◎ | X | ◎ | X |
| 5 | Invention Example 4 | ○ | ○ | ◎ | ◎ | ◎ | ◎ |
| 6 | Invention Example 5 | ○ | ○ | ◎ | ◎ | ◎ | ◎ |
| 7 | Invention Example 6 | ○ | ○ | ◎ | ◎ | ○ | ◎ |
| 8 | Comparative Example 2 | ○ | ○ | ◎ | ◎ | Δ | ◎ |
| 9 | Comparative Example 3 | ○ | ○ | ◎ | X | X | ◎ |
| 10 | Comparative Example 4 | ○ | ○ | ◎ | X | ○ | ◎ |
| 11 | Comparative Example 5 | ○ | ○ | ○ | X | X | ◎ |
| 12 | Comparative Example 6 | ○ | ○ | ◎ | Δ | X | ◎ |
| 13 | Comparative Example 7 | ○ | ○ | ◎ | X | ○ | ◎ |
| 14 | Comparative Example 8 | ○ | ○ | ◎ | X | ○ | ◎ |
| 15 | Comparative Example 9 | ○ | ○ | ◎ | X | Δ | Δ |
| 16 | Invention Example 7 | ○ | ○ | ◎ | ◎ | ◎ | ◎ |
| 17 | Invention Example 8 | ○ | ○ | ◎ | ○ | ◎ | ◎ |
| 18 | Invention Example 9 | ○ | ○ | ◎ | ○ | ○ | ◎ |
| 19 | Comparative Example 10 | ○ | ○ | ◎ | ○ | ○ | Δ |
| 20 | Invention Example 10 | ○ | ○ | ◎ | ○ | ○ | ○ |
| 21 | Invention Example 11 | ○ | ○ | ◎ | ◎ | ○ | ◎ |
| 22 | Comparative Example 11 | ○ | ○ | ◎ | X | ○ | ◎ |
| 23 | Comparative Example 12 | ○ | ○ | Δ | Δ | X | ◎ |
| 24 | Invention Example 12 | ○ | ○ | ◎ | ○ | ○ | ◎ |
| 25 | Invention Example 13 | ○ | ○ | ◎ | ◎ | ◎ | ◎ |
| 26 | Comparative Example 13 | ○ | ○ | ◎ | X | ◎ | ◎ |

TABLE 8-5-continued

| | | | | | | | |
|---|---|---|---|---|---|---|---|
| 27 | Comparative Example 14 | ○ | ○ | X | X | X | ◎ |
| 28 | Invention Example 14 | ○ | ○ | ○ | ○ | ○ | ◎ |
| 29 | Invention Example 15 | ○ | ○ | ○ | ○ | ○ | ◎ |
| 30 | Comparative Example 15 | ○ | ○ | ◎ | ○ | X | ◎ |
| 31 | Invention Example 16 | ○ | ○ | ◎ | ◎ | ◎ | ◎ |
| 32 | Invention Example 17 | ○ | ○ | ◎ | ◎ | ◎ | ◎ |
| 33 | Invention Example 18 | ○ | ○ | ◎ | ◎ | ◎ | ◎ |
| 34 | Invention Example 19 | ○ | ○ | ◎ | ◎ | ◎ | ◎ |
| 35 | Invention Example 20 | ○ | ○ | ◎ | ◎ | ◎ | ◎ |
| 36 | Comparative Example 16 | ○ | ○ | △ | X | X | ◎ |
| 37 | Comparative Example 17 | ○ | ○ | ○ | △ | △ | ◎ |
| 38 | Invention Example 21 | ○ | ○ | ○ | ○ | ○ | ◎ |
| 39 | Invention Example 22 | ○ | ○ | ◎ | ◎ | ◎ | ◎ |

| | Paintability | | Solvent resistance (9) | Storage stability (10) | | | | Lubricity (11) |
|---|---|---|---|---|---|---|---|---|
| | | | | | Corrosion resisance | | | |
| No. | (7) Direct | (8) After degreasing | | Appearance | Plane portion | Bend portion | After degreasing | |
| 1 | ◎ | ◎ | ◎ | ◎ | ◎ | ◎ | ◎ | △ |
| 2 | ◎ | ◎ | ◎ | ◎ | ◎ | ○ | ○ | X |
| 3 | ◎ | ◎ | ◎ | ◎ | ○ | ○ | ○ | X |
| 4 | ◎ | ◎ | ◎ | ◎ | ○ | X | X | X |
| 5 | ◎ | ◎ | ○+ | ◎ | ◎ | ◎ | ◎ | △ |
| 6 | ◎ | ○+ | ○ | ◎ | ◎ | ◎ | ◎ | △ |
| 7 | ◎ | ○- | ○- | ◎ | ◎ | ◎ | ○ | △ |
| 8 | ◎ | △ | X | ◎ | ◎ | △ | X | △ |
| 9 | ○ | X | ○+ | ◎ | ○ | X | X | △ |
| 10 | ◎ | △ | ◎ | ◎ | ◎ | X | △ | △ |
| 11 | ◎ | ◎ | ◎ | ◎ | ○ | X | X | △ |
| 12 | ◎ | X | ◎ | △ | ○ | X | X | △ |
| 13 | ◎ | ○ | ◎ | ◎ | △ | X | ○ | X |
| 14 | ◎ | ○+ | ◎ | ◎ | ○ | X | △ | X |
| 15 | ◎ | ○- | X | ◎ | ○ | X | X | △ |
| 16 | ◎ | ◎ | ◎ | ◎ | ◎ | ◎ | ◎ | △ |
| 17 | ◎ | ◎ | ◎ | ◎ | ◎ | ○ | ◎ | △ |
| 18 | ◎ | ◎ | ◎ | ◎ | ◎ | ○ | ○ | △ |
| 19 | ○+ | △ | X | ◎ | ◎ | ○ | ○ | △ |
| 20 | ◎ | ◎ | ◎ | ◎ | ◎ | ○ | ○ | △ |
| 21 | ◎ | ◎ | ◎ | ◎ | ○ | ○ | ○ | X |
| 22 | ◎ | ◎ | ◎ | ◎ | X | X | X | X |
| 23 | ○+ | X | ○+ | ◎ | △ | X | X | △ |
| 24 | ◎ | ◎ | ◎ | ◎ | ○ | ○ | ○ | △ |
| 25 | ◎ | ◎ | ◎ | ◎ | ◎ | △ | ○ | △ |
| 26 | ◎ | ◎ | ◎ | △ | ○ | X | X | △ |
| 27 | ◎ | ◎ | ○ | ◎ | X | X | X | △ |
| 28 | ◎ | ◎ | ◎ | ◎ | ○ | ○ | ○ | △ |
| 29 | ◎ | ○ | ◎ | ◎ | ○ | ○ | ○ | △ |
| 30 | ◎ | X | ◎ | ○ | ○ | X | X | △ |
| 31 | ◎ | ◎ | ◎ | ◎ | ◎ | ◎ | ◎ | ◎ |
| 32 | ◎ | ◎ | ◎ | ◎ | ◎ | ◎ | ◎ | ◎ |
| 33 | ◎ | ◎ | ◎ | ◎ | ◎ | ◎ | ◎ | △ |
| 34 | ◎ | ◎ | ◎ | ◎ | ◎ | ◎ | ◎ | ◎ |
| 35 | ◎ | ◎ | ◎ | ◎ | ◎ | ◎ | ◎ | ○ |
| 36 | △ | △ | ◎ | ◎ | X | X | X | △ |
| 37 | ○ | ○ | ◎ | ◎ | △ | X | X | △ |
| 38 | ◎ | ◎ | ◎ | ◎ | ○ | ○ | ○ | △ |
| 39 | ◎ | ◎ | ◎ | ◎ | ◎ | ◎ | ◎ | △ |

TABLE 8-6

| No. | | Surface appearance (1) | Conductivity (2) | Corrosion resistance | | | Heat discoloration resistance (6) |
|---|---|---|---|---|---|---|---|
| | | | | (3) Plane portion | (4) Bend portion | (5) After degreasing | |
| 40 | Comparative Example 18 | ○ | ○ | △ | △ | △ | ◎ |
| 41 | Comparative Example 19 | Tests were stopped due to gelling of the treatment solution. | | | | | |
| 42 | Comparative Example 20 | ○ | ○ | X | X | X | ◎ |
| 43 | Invention Example 23 | ○ | ○ | ◎ | ◎ | ◎ | ◎ |
| 44 | Invention Example 24 | ○ | ○ | ○ | ○ | ○ | ◎ |
| 45 | Comparative Example 21 | ○ | △ | ◎ | ◎ | ◎ | ◎ |
| 46 | Comparative Example 22 | ○ | ○ | ○ | ○ | X | ◎ |
| 47 | Invention Example 25 | ○ | ○ | ○ | ○ | ○ | ◎ |

TABLE 8-6-continued

| No. | | | | | | | |
|---|---|---|---|---|---|---|---|
| 48 | Invention Example 26 | ○ | ○ | ◎ | ◎ | ◎ | ◎ |
| 49 | Comparative Example 23 | ○ | ○ | ◎ | Δ | ◎ | ◎ |
| 50 | Invention Example 27 | ○ | ○ | ◎ | ◎ | ◎ | ◎ |
| 51 | Comparative Example 23 | Tests were stopped due to gelling of the treatment solution. | | | | | |
| 52 | Comparative Example 24 | ○ | ○ | Δ | X | X | ◎ |
| 53 | Comparative Example 25 | ○ | ○ | ◎ | Δ | ○ | ◎ |
| 54 | Comparative Example 26 | Tests were stopped due to gelling of the treatment solution. | | | | | |
| 55 | Comparative Example 27 | Tests were stopped due to gelling of the treatment solution. | | | | | |
| 56 | Comparative Example 28 | ○ | ○ | Δ | X | X | ◎ |
| 57 | Comparative Example 29 | ○ | ○ | ◎ | Δ | ○ | ◎ |
| 58 | Comparative Example 30 | Tests were stopped due to gelling of the treatment solution. | | | | | |
| 59 | Invention Example 28 | ○ | ○ | ◎ | ◎ | ◎ | ◎ |
| 60 | Invention Example 29 | ○ | ○ | ◎ | ○ | ◎ | ◎ |
| 61 | Invention Example 30 | ○ | ○ | ◎ | ◎ | ○ | ◎ |
| 62 | Invention Example 31 | ○ | ○ | ◎ | ◎ | ◎ | ◎ |
| 63 | Comparative Example 31 | Tests were stopped due to gelling of the treatment solution. | | | | | |
| 64 | Comparative Example 32 | ○ | ○ | Δ | X | X | ◎ |
| 65 | Comparative Example 33 | ○ | ○ | ◎ | Δ | ○ | ◎ |
| 66 | Comparative Example 34 | Tests were stopped due to gelling of the treatment solution. | | | | | |
| 67 | Comparative Example 35 | Tests were stopped due to gelling of the treatment solution. | | | | | |
| 68 | Comparative Example 36 | ○ | ○ | Δ | X | X | ◎ |
| 69 | Comparative Example 37 | ○ | ○ | ◎ | Δ | ○ | ◎ |
| 70 | Comparative Example 38 | Tests were stopped due to gelling of the treatment solution. | | | | | |
| 71 | Invention Example 32 | ○ | ○ | ◎ | ◎ | ◎ | ◎ |
| 72 | Invention Example 33 | ○ | ○ | ◎ | ◎ | ○ | ◎ |
| 73 | Comparative Example 39 | Tests were stopped due to gelling of the treatment solution. | | | | | |
| 74 | Comparative Example 40 | Tests were stopped due to gelling of the treatment solution. | | | | | |
| 75 | Invention Example 34 | ○ | ○ | ◎ | ◎ | ◎ | ◎ |
| 76 | Comparative Example 41 | ○ | ○ | ◎ | Δ | X | ◎ |
| 77 | Invention Example 35 | ○ | ○ | ◎ | ○ | ○ | ◎ |

| | Paintability | | Solvent | Storage stability (10) | | | Lubricity (11) |
|---|---|---|---|---|---|---|---|
| | | | resistance | Appearance | Corrosion resisance | | |
| No. | (7) Direct | (8) After degreasing | (9) | | Plane portion | Bend portion | After degreasing |
| 40 | ◎ | ○ | ◎ | ◎ | Δ | Δ | Δ | Δ |
| 41 | Tests were stopped due to gelling of the treatment solution. | | | | | | | |
| 42 | ◎ | ○- | ◎ | ◎ | X | X | X | Δ |
| 43 | ◎ | ◎ | ◎ | ◎ | ◎ | ◎ | ◎ | Δ |
| 44 | ◎ | ◎ | ◎ | ◎ | ○ | ○ | ○ | Δ |
| 45 | ◎ | ◎ | ○+ | ◎ | ◎ | ◎ | ◎ | Δ |
| 46 | ○ | X | Δ | ◎ | ○ | ○ | X | Δ |
| 47 | ◎ | ○ | ○ | ◎ | ○ | ○ | ○ | Δ |
| 48 | ◎ | ◎ | ◎ | ◎ | ◎ | ◎ | ◎ | Δ |
| 49 | Δ | Δ | ◎ | ◎ | ◎ | Δ | ◎ | Δ |
| 50 | ◎ | ◎ | ◎ | ◎ | ◎ | ○ | ◎ | Δ |
| 51 | Tests were stopped due to gelling of the treatment solution. | | | | | | | |
| 52 | ○ | X | ◎ | ◎ | X | X | X | Δ |
| 53 | ◎ | ◎ | ◎ | X | Tests were stopped due to gelling. | | | Δ |
| 54 | Tests were stopped due to gelling of the treatment solution. | | | | | | | |
| 55 | Tests were stopped due to gelling of the treatment solution. | | | | | | | |
| 56 | ○ | X | ◎ | ◎ | X | X | X | Δ |
| 57 | ◎ | ◎ | ◎ | X | Tests were stopped due to gelling. | | | Δ |
| 58 | Tests were stopped due to gelling of the treatment solution. | | | | | | | |
| 59 | ◎ | ◎ | ◎ | ◎ | ◎ | ◎ | ◎ | Δ |
| 60 | ◎ | ◎ | ◎ | ◎ | ◎ | ○ | ◎ | Δ |
| 61 | ◎ | ○ | ◎ | ◎ | ◎ | ◎ | ○ | Δ |
| 62 | ◎ | ◎ | ◎ | ◎ | ◎ | ◎ | ○ | Δ |
| 63 | Tests were stopped due to gelling of the treatment solution. | | | | | | | |
| 64 | ○ | X | ◎ | ◎ | X | X | X | Δ |
| 65 | ◎ | ◎ | ◎ | X | Tests were stopped due to gelling. | | | Δ |
| 66 | Tests were stopped due to gelling of the treatment solution. | | | | | | | |
| 67 | Tests were stopped due to gelling of the treatment solution. | | | | | | | |
| 68 | ○ | X | ◎ | ◎ | X | X | X | Δ |
| 69 | ◎ | ◎ | ◎ | X | Tests were stopped due to gelling. | | | Δ |
| 70 | Tests were stopped due to gelling of the treatment solution. | | | | | | | |
| 71 | ◎ | ◎ | ◎ | ◎ | ◎ | ◎ | ○ | Δ |
| 72 | ◎ | ○ | ◎ | ◎ | ◎ | ○ | ○ | Δ |
| 73 | Tests were stopped due to gelling of the treatment solution. | | | | | | | |
| 74 | Tests were stopped due to gelling of the treatment solution. | | | | | | | |
| 75 | ◎ | ◎ | ◎ | ◎ | ◎ | ◎ | ◎ | Δ |

TABLE 8-6-continued

| | | | | | | | | |
|---|---|---|---|---|---|---|---|---|
| 76 | ○ | Δ | ○ | ◎ | ○ | X | X | Δ |
| 77 | ◎ | ○ | ◎ | ◎ | ◎ | ○ | ○ | Δ |

Tables 8 indicate that when the surface treatment agent within the scope of the present invention is used for the hot-dip galvanized steel sheet with coated surface roughness within the scope of the present invention, excellent performance is exhibited with respect to any of the surface appearance, conductivity, and corrosion resistance. On the other hand, even when the coated surface roughness falls within the scope of the present invention, use of the surface treatment agent out of the scope of the present invention has difficulty in satisfying both the conductivity and corrosion resistance.

Tables 8 further indicate that any of the test sheets produced using the surface treatment agents within the scope of the present invention has excellent corrosion resistance (at a plane portion and a processed portion and after degreasing), heat discoloration resistance, paintability (evaluated directly and after degreasing), and solvent resistance. In addition, the surface treatment agents within the scope of the present invention maintain the same excellent quality before and after storage.

On the other hand, the surface treatment agent of Comparative Example 1 (No. 4) out of the scope of the present invention contains the cationic urethane (B) at a content less than the scope of the present invention, thereby showing no corrosion resistance at a bend portion and a decrease in corrosion resistance after storage. In addition, heat discoloration resistance is degraded. In Comparative Example 2 (No. 8) and Comparative Example 9 (No. 15), the content of the cationic urethane (B) exceeds the scope of the present invention, thereby causing lower quality after alkaline degreasing and unsatisfactory solvent resistance. In particular, Comparative Example 9 (No. 15) does not exhibit corrosion resistance at a bend portion. In Comparative Example 3 (No. 9), Comparative Example 4 (No. 10), Comparative Example 7 (No. 13), Comparative Example 8 (No. 14), and Comparative Example 9 (No. 15), the organic titanium chelate compound (D) of the present invention is not mixed, thereby causing no quality at a bend portion and after alkaline degreasing.

Comparative Example 5 (No. 11), Comparative Example 7 (No. 13), and Comparative Example 8 (No. 14) each do not contain the tetravalent vanadyl compound (E) and exhibit no corrosion resistance at a bend portion and a decrease in quality after storage. Comparative Example 6 (No. 12) uses a pentavalent vanadyl compound and thus exhibits no corrosion resistance at a bend portion and after alkaline degreasing and further exhibits decreased paintability after alkaline degreasing. In Comparative Example 7 (No. 13) and Comparative Example 9 (No. 15), the tests were performed with reference to U.S. Pat. No. 3,883,831 and Japanese Unexamined Patent Application Publication No. 2006-152436, respectively.

Comparative Example 10 (No. 19) contains the silane coupling agent (C) at a content less than the scope of the present invention and thus exhibits lower solvent resistance, while Comparative Example 11 (No. 22) contains the silane coupling agent at a content exceeding the scope of the present invention and thus exhibits no corrosion resistance at a bend portion and no corrosion resistance of the solution after storage. In Comparative Example 12 (No. 23), the content of the silane coupling agent (C) relative to the organic titanium chelate compound (D) exceeds the scope of the present invention, thereby causing lower corrosion resistance and paintability after alkaline degreasing, while in Comparative Example 13 (No. 25), the content of the silane coupling agent (C) is less than the scope of the present invention, thereby causing no corrosion resistance at a bend portion and no corrosion resistance of the solution after storage.

In Comparative Example 14 (No. 27), the vanadium content of the tetravalent vanadyl compound (E) relative to the titanium content of the organic titanium chelate compound (D) is less than the scope of the present invention, and thus corrosion resistance is not exhibited. While in Comparative Example 15 (No. 30), the vanadium content exceeds the scope of the present invention, and thus corrosion resistance and paintability after alkaline degreasing are degraded. Comparative Example 16 (No. 36), Comparative Example 17 (No. 37), and Comparative Example 18 (No. 40), which are not adjusted to proper pH, exhibit no corrosion resistance and lower storage stability. Comparative Example 19 (No. 41) with high pH could not be tested because of gelling of the chemical agent.

In Comparative Example 20 (No. 42), the coating weight of the coating film is less than the scope of the present invention, and thus satisfactory corrosion resistance is not obtained. While Comparative Example 21 (No. 45) exhibits a decrease in conductivity because the coating weight of the coating film exceeds the scope of the present invention.

With respect to the resin compound (A), in Comparative Example 24 (No. 51), Comparative Example 28 (No. 55), Comparative Example 32 (No. 63), and Comparative Example 36 (No. 67), the average number of Z groups substituted is less than the scope of the present invention, while in Comparative Example 27 (No. 54), Comparative Example 31 (No. 58), Comparative Example 35 (No. 66), and Comparative Example 39 (No. 70), the number of carbon atoms in an alkyl group as the Z group exceeds the scope of the present invention. Therefore, in these comparative examples, an undissolved substance was produced in the step of forming the surface treatment agent. In Comparative Example 25 (No. 52), Comparative Example 29 (No. 56), Comparative Example 33 (No. 64), and Comparative Example 37 (No. 68), the average number of Z groups substituted exceeds the scope of the present invention, and thus the same quality could not be maintained before and after storage of the surface treatment agent. In Comparative Example 26 (No. 53), Comparative Example 30 (No. 57), Comparative Example 34 (No. 65), and Comparative Example 38 (No. 69), the average degree of polymerization of Z groups exceeds the scope of the present invention, producing gelling of the surface treatment agent after storage.

Comparative Example 40 (No. 73) uses a nonionic urethane resin and Comparative Example 41 (No. 74) uses an anionic urethane resin, thereby causing aggregation of the urethane resin in the step of forming the surface treatment agent. Comparative Example 42 (No. 76) uses a silane coupling agent out of the scope of the present invention and thus cannot exhibit satisfactory corrosion resistance.

In addition, even when the surface treatment agent within the scope of the present invention is used, the desired effect cannot be obtained under drying conditions out of the scope of the present invention. Comparative Example 22 (No. 46) and Comparative Example 23 (No. 49) are both the surface treatment agents within the scope of the present invention and thus exhibit excellent heat discoloration resistance and storage stability (appearance). However, in Comparative Example 22 (No. 46), the drying temperature is lower than the scope of the present invention according to claim 1 of this application, and thus satisfactory corrosion resistance is not obtained. While in Comparative Example 24 (No. 49), the drying temperature exceeds the scope of the present invention according to claim 1 of this application, and thus corrosion resistance at a bend portion and paintability are decreased.

Example 2

Next, a coating film was formed by the same method as in Example 1 using each of the surface treatment agents (compositions of Nos. 1 and 31) within the scope of the present invention while the coated surface roughness of the hot-dip galvanized steel sheet (GI) shown in Table 7 was variously changed, and the surface appearance, conductivity, and corrosion resistance were evaluated. The evaluation methods and evaluation criteria were the same as in Example 1. The evaluation results and Ra and PPI values are shown in Tables 9.

Tables 9 indicate that with coated surface roughness within the scope of the present invention, excellent performance is exhibited with respect to any of the surface appearance, conductivity, and corrosion resistance. On the other hand, with coated surface roughness out of the scope of the present invention (Ra of less than 0.5 μm, and PPI of less than 150), not only the surface appearance is impaired, but also conductivity is decreased. Further, when Ra exceeds 2.0 μm, corrosion resistance is degraded.

According to the present invention, when a coated surface is adjusted to Ra and PPI in predetermined ranges, not only a uniform surface appearance but also conductivity can be improved. In addition, by using a specified surface treatment agent, both conductivity and corrosion resistance can be satisfied, resulting in a hot-dip galvanized steel sheet satisfying all of the surface appearance, conductivity, and corrosion resistance.

REFERENCE SIGNS LIST

1 hot-dip galvanized steel sheet
2 coating layer
3 surface treatment coating film

TABLE 9-1

| | Surface treatment agent Type: No. 1 (Invention Example 1) | Roughness of coated surface | | Surface appearance | Conductivity | Corrosion resistance | | |
|---|---|---|---|---|---|---|---|---|
| | | Ra | | | | (3) | (4) | (5) |
| No. | | μm | PPI | (1) | (2) | Plane portion | Bend portion | After degreasing |
| 78 | Comparative Example | 0.4 | 170 | Δ | Δ | ◎ | ◎ | ◎ |
| 79 | Invention Example | 0.5 | 170 | ○ | ○ | ◎ | ◎ | ◎ |
| 80 | Invention Example | 0.7 | 170 | ○ | ○ | ◎ | ◎ | ◎ |
| 81 | Invention Example | 1.2 | 170 | ○ | ○ | ◎ | ◎ | ◎ |
| 82 | Invention Example | 2.0 | 170 | ○ | ○ | ○ | ○ | ○ |
| 83 | Comparative Example | 2.2 | 170 | ○ | ○ | Δ | Δ | Δ |
| 84 | Comparative Example | 0.7 | 140 | Δ | Δ | ◎ | ◎ | ◎ |
| 85 | Invention Example | 0.7 | 150 | ○ | ○ | ◎ | ◎ | ◎ |
| 86 | Invention Example | 0.7 | 200 | ○ | ○ | ◎ | ◎ | ◎ |
| 87 | Invention Example | 0.7 | 300 | ○ | ○ | ○ | ○ | ○ |
| 88 | Comparative Example | 0.4 | 140 | Δ | Δ | ◎ | ◎ | ◎ |
| 89 | Comparative Example | 2.2 | 140 | Δ | Δ | Δ | Δ | Δ |
| 90 | Comparative Example | 0.2 | 50 | X | X | ◎ | ◎ | ◎ |

TABLE 9-2

| | Surface treatment agent Type: No. 31 (Invention Example 16) | Roughness of coated surface | | Surface appearance | Conductivity | Corrosion resistance | | |
|---|---|---|---|---|---|---|---|---|
| | | Ra | | | | (3) | (4) | (5) |
| No. | | μm | PPI | (1) | (2) | Plane portion | Bend portion | After degreasing |
| 91 | Comparative Example | 0.4 | 170 | Δ | Δ | ◎ | ◎ | ◎ |
| 92 | Invention Example | 0.5 | 170 | ○ | ○ | ◎ | ◎ | ◎ |
| 93 | Invention Example | 0.7 | 170 | ○ | ○ | ◎ | ◎ | ◎ |
| 94 | Invention Example | 1.2 | 170 | ○ | ○ | ◎ | ◎ | ◎ |
| 95 | Invention Example | 2.0 | 170 | ○ | ○ | ○ | ○ | ○ |
| 96 | Comparative Example | 2.2 | 170 | ○ | ○ | Δ | Δ | Δ |
| 97 | Comparative Example | 0.7 | 140 | Δ | Δ | ◎ | ◎ | ◎ |
| 98 | Invention Example | 0.7 | 150 | ○ | ○ | ◎ | ◎ | ◎ |
| 99 | Invention Example | 0.7 | 200 | ○ | ○ | ◎ | ◎ | ◎ |
| 100 | Invention Example | 0.7 | 300 | ○ | ○ | ○ | ○ | ○ |
| 101 | Comparative Example | 0.4 | 140 | Δ | Δ | ◎ | ◎ | ◎ |
| 102 | Comparative Example | 2.2 | 140 | Δ | Δ | Δ | Δ | Δ |
| 103 | Comparative Example | 0.2 | 50 | X | X | ◎ | ◎ | ◎ |

The invention claimed is:

1. A method for producing a hot-dip galvanized steel sheet, the method comprising:
applying a surface treatment agent with a pH of 4 to 5 to a hot-dip galvanized steel sheet having a Ra of 0.5 to 2.0 µm and a PPI of 150 or more; and
drying the surface treatment agent at an ultimate sheet temperature of 50° C. to 180° C. to form a surface treatment coating film having a coating weight of 0.2 to 1.0 g/m² on the surface of the steel sheet, the surface treatment agent containing:
(A) a resin compound having a bisphenol skeleton represented by general formula (I) described below (hereinafter referred to as "resin compound (A)");
(B) a cationic urethane resin emulsion having at least one cationic functional group selected from primary to tertiary amino groups and quaternary ammonium bases (hereinafter referred to as "cationic urethane (B)");
(C) at least one silane coupling agent having at least one reactive functional group selected from an active hydrogen-containing amino group, an epoxy group, a mercapto group, and a methacryloxy group;
(D) an organic titanium chelate compound;
(E) a tetravalent vanadyl compound; and
(F) water,
wherein the solid content of the cationic urethane (B) is 0.10 to 0.30 in terms of ratio by mass [(b)/{(a)+(b)+(c)}] relative to the total solid content of the resin compound (A), the cationic urethane (B), and the silane coupling agent (C);
the solid content of the silane coupling agent (C) is 0.60 to 0.85 in terms of ratio by mass [(c)/{(a)+(b)+(c)}] relative to the total solid content of the resin compound (A), the cationic urethane (B), and the silane coupling agent (C);
the solid content of the silane coupling agent (C) is 50 to 70 in terms of ratio by mass [(c)/Ti] relative to the content of the organic titanium chelate compound (D) in terms of titanium; and
the content of the tetravalent vanadyl compound (E) in terms of vanadium is 0.30 to 0.50 in terms of ratio by mass (V/Ti) relative to the content of the organic titanium chelate compound (D) in terms of titanium;
Ra represents arithmetic mean roughness according to JIS B 0601-1994, and PPI represents the number of peaks per 25.4 mm (1 inch) according to SAEJ911 determined from a roughness curve according to JIS B 0601-1994; and
in each of the equations, (a) represents the solid content of the resin compound (A); (b), the solid content of the cationic urethane (B); (c), the solid content of the silane coupling agent (C); Ti, the content of the organic titanium chelate compound (D) in terms of titanium; and V, the content of the tetravalent vanadyl compound (E) in terms of vanadium;

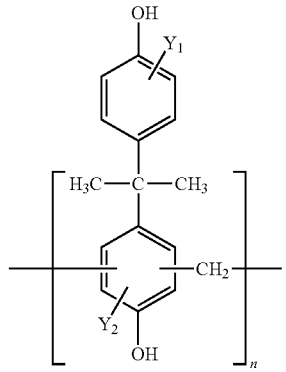

(I)

wherein in the formula (I), $Y_1$ and $Y_2$ bonded to benzene rings are each independently a hydrogen atom or a Z group represented by general formula (II) or (III) below, the average number of Z groups substituted per benzene ring is 0.2 to 1.0, and n represents an integer of 2 to 50;

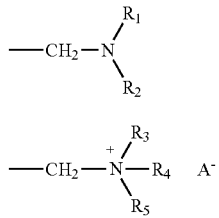

(II)

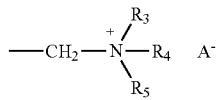

(III)

wherein in the formulae (II) and (III), $R_1$, $R_2$, $R_3$, $R_4$, and $R_5$ each independently represent a hydrogen atom, an alkyl group having 1 to 10 carbon atoms, or a hydroxyalkyl group having 1 to 10 carbon atoms, and A⁻ represents a hydroxide ion or an acid ion.

2. The method for producing a hot-dip galvanized steel sheet according to claim 1, wherein the surface treatment agent further contains wax (W), and the solid content of the wax (W) is 0.01 to 0.10 in terms of ratio by mass relative to the surface treatment coating film.

3. A hot-dip galvanized steel sheet produced using the method for producing a hot-dip galvanized steel sheet according to claim 1.

4. A hot-dip galvanized steel sheet produced using the method for producing a hot-dip galvanized steel sheet according to claim 2.

* * * * *